(12) United States Patent
Adhikari

(10) Patent No.: US 11,479,691 B2
(45) Date of Patent: Oct. 25, 2022

(54) SPRAYABLE POLYURETHANE/UREA ELASTOMER FOR AGRICULTURE

(71) Applicant: COMMONWEALTH SCIENTIFIC AND INDUSTRIAL RESEARCH ORGANISATION, Australian Capital Territory (AU)

(72) Inventor: Raju Adhikari, Glen Waverley (AU)

(73) Assignee: COMMONWEALTH SCIENTIFIC AND INDUSTRIAL RESEARCH ORGANISATION, Australian Capital Territory (AU)

( * ) Notice: Subject to any disclaimer, the term of this patent is extended or adjusted under 35 U.S.C. 154(b) by 1179 days.

(21) Appl. No.: 15/780,379

(22) PCT Filed: Nov. 30, 2016

(86) PCT No.: PCT/AU2016/051171
§ 371 (c)(1),
(2) Date: May 31, 2018

(87) PCT Pub. No.: WO2017/091853
PCT Pub. Date: Jun. 8, 2017

(65) Prior Publication Data
US 2019/0031912 A1    Jan. 31, 2019

(30) Foreign Application Priority Data
Dec. 2, 2015 (AU) .................. 2015904990

(51) Int. Cl.
C09D 175/12 (2006.01)
C08G 18/75 (2006.01)
C08G 18/42 (2006.01)
C08G 18/08 (2006.01)
C08G 18/32 (2006.01)
(Continued)

(52) U.S. Cl.
CPC ....... *C09D 175/12* (2013.01); *A01G 13/0275* (2013.01); *C05G 5/37* (2020.02); *C08G 18/0809* (2013.01); *C08G 18/0814* (2013.01); *C08G 18/0823* (2013.01); *C08G 18/10* (2013.01); *C08G 18/3228* (2013.01); *C08G 18/3275* (2013.01); *C08G 18/348* (2013.01); *C08G 18/4277* (2013.01); *C08G 18/4615* (2013.01); *C08G 18/603* (2013.01); *C08G 18/6204* (2013.01); *C08G 18/6541* (2013.01); *C08G 18/6655* (2013.01); *C08G 18/755* (2013.01); *C08G 2230/00* (2013.01); *C08G 2310/00* (2013.01); *C08K 3/04* (2013.01)

(58) Field of Classification Search
CPC .............. C08G 18/755; C08G 18/4277; C08G 18/0823; C08G 18/3275; C08G 18/6655; C08G 18/4615; C08G 18/0814; C08G 5/37; C08G 18/0809; C08G 18/10; C08G 18/3228; C08G 18/348; C08G 18/603; C08G 18/6204; C08G 18/6541; C08G 2230/00; C08G 2310/00; C08K 3/04; A01G 13/0275
See application file for complete search history.

(56) References Cited

U.S. PATENT DOCUMENTS 3,574,150 A * 4/1971 Jefferson et al. .......... C08J 9/28
428/338
4,129,435 A  12/1978 Takematsu et al.
(Continued)

FOREIGN PATENT DOCUMENTS

AU    2013/347034 A1   5/2014
FR    2168489 A1       8/1973
(Continued)

OTHER PUBLICATIONS

International Search Report (ISR) and Written Opinion (WO) dated Jan. 30, 2017 for International Aoplication No. PCT/AU2016/051171.
FR 2168489 A 1 _ Aug. 1973 _ Machine translation retrieved from ESPACENET database.
JP 2005-240023 _ Sep. 8, 2005 _ Machine translation retrieved from ESPACENET database.

*Primary Examiner* — Patrick D Niland
(74) *Attorney, Agent, or Firm* — Ladas & Parry LLP

(57) ABSTRACT

A process for preparing a polymeric membrane for materials used in crop production comprising:
a) providing an aqueous dispersion of a polyurethane or polyurethane-urea elastomer comprising segments formed from the copolymer segment of Formula I $$A^1\text{-}[Y^1]_n\text{-}L\text{-}[Y^2]_q\text{-}A^2 \qquad \text{Formula I}$$

wherein
$A^1$ is an end capping group;
$A^2$ is hydrogen or an end capping group;
each $[Y^1]_n$ and $[Y^2]_q$ is independently selected from a polyether macrodiol, polycarbonate macrodiol, polyester macrodiol,
and wherein at least one of $[Y^1]_n$ and $[Y^2]_q$ is a polyester macrodiol;
L is a divalent linking compound independently selected from urethane, urea, carbonate, ester, and phosphonate;
n is an integer of 2 to 50;
q is an integer of 2 to 50; and
b) spraying the aqueous dispersion onto materials to be used in crop production to form a polymeric membrane on the materials.

20 Claims, 5 Drawing Sheets

(51) Int. Cl.
    *C08G 18/66*     (2006.01)
    *C08G 18/46*     (2006.01)
    *C05G 5/30*     (2020.01)
    *A01G 13/02*     (2006.01)
    *C08G 18/10*     (2006.01)
    *C08G 18/34*     (2006.01)
    *C08G 18/60*     (2006.01)
    *C08G 18/62*     (2006.01)
    *C08G 18/65*     (2006.01)
    *C08K 3/04*     (2006.01)

(56) References Cited

U.S. PATENT DOCUMENTS

| | | | |
|---|---|---|---|
| 6,018,004 | A | 1/2000 | Warzelhan et al. |
| 6,258,924 | B1 | 7/2001 | Warzelhan et al. |
| 2005/0013793 | A1* | 1/2005 | Beckman ........... C08G 18/6692 525/54.1 |

FOREIGN PATENT DOCUMENTS

| | | |
|---|---|---|
| JP | 2005-240023 A | 9/2005 |
| WO | 2015/184490 A1 | 12/2015 |

\* cited by examiner

SPRAYABLE POLYURETHANE/UREA ELASTOMER FOR AGRICULTURE

RELATED APPLICATION

This application is an application under 35 U.S.C. 371 of International Application No. PCT/AU2016/051171 filed on 30 Nov. 2016, which claims priority from Australian Application No. 2015904990 filed on 2 Dec. 2015, the entire contents of which are incorporated herein by reference.

TECHNICAL FIELD

The invention relates to the production of a polymeric membrane of a polyurethane or polyurethane-urea elastomer for agriculture, a process for preparing an aqueous dispersion of a polyurethane or polyurethane-urea elastomer for forming a polymeric membrane of a polyurethane or polyurethane-urea elastomer by spray application to soil materials used in crop production. The invention further relates to a method of enhancing crop production through the use of such membrane.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge in Australia or any other country as at the priority date of any one of the claims of this specification.

Plastic is widely used in agriculture to enhance crop production by modifying soil temperature, suppressing weeds and conserving water. The plastic which is most widely used is a preformed continuous non-biodegradable polyolefin film which is spread over the soil using specialist application equipment to shape and apply the plastic to prepared soil. Crops are planted through cuts or holes produced in the plastic. The plastic film must be deployed before use and removed after each growing season (or series of seasons) which contributes to a significant increase in cost through material and transport, additional associated labour, specialist equipment and end of life waste disposal. Complete recovery of the waste plastic is problematic as a portion of the plastic may be buried, may become torn and partly degraded and thus difficult to recover. Consequently, plastic that is not recovered presents not only a significant environmental problem, but can complicate the preparation and deployment of new plastic in successive growing seasons.

Attempts have been made to prepare a plastic film in situ by spraying latex to soil (e.g. polyvinyl acetate, polyacrylates, styrene butadiene (SBR)) but this alternative has received little practical use due to the difficulty of producing a film which provides the required film properties during the growing season and which can be readily applied with typical on farm spraying equipment.

Sprayable biodegradable films based on natural polysaccharides (Immirzi et al 2009, Mormile et al 2007, Schettini et al 2007), hydrolysed proteins from waste products of leather alone and/or blends with synthetic and natural polymers (Chiellinie et al 2001) have been reported as a coating on soils.

Natural polymers from renewable sources such as seaweeds and crustaceous shells containing natural polymers and reinforcing cellulosic fibres from waste materials such as seeds and peels from tomato, olive and hemp processing are being tested as waterborne sprayable films (www.ictmp.ct.cnr.it).

Liquid films comprising of a mixture of biomaterial kelp and polyvinyl alcohol (PA) have also been tested on soils (Advanced Materials Research Vols. 328-330, 1462-1466, 2011).

Commercially available sprayable polymer emulsions/dispersions are predominantly used for protective and/or decorative coating applications across a variety of industrial applications. Film forming polymers are used as spray adjuvants and anti-transpirant films for horticulture and agriculture to form an artificial film on plant surfaces (e.g. leaves) for disease and pest control. These include oils, waxes, silicones and a variety of plastics films including products such as Nu-Film-Pn Nu-Film-17 film, Vapo-Gard film forming composition (based on natural pinolene) from Agspec and Moisturin, a vinyl-acrylic film from WellPlant.

The present invention seeks to provide a process for preparing a polymeric membrane of a polyurethane or polyurethane-urea elastomer for spray application to soil materials used in crop production, which will overcome or substantially ameliorate at least some of the deficiencies of the prior art, or to at least provide an alternative.

SUMMARY OF THE INVENTION

According to a first aspect of the present invention, there is provided a process for preparing a polymeric membrane for materials used in crop production comprising;

a) providing an aqueous dispersion of a polyurethane or polyurethane-urea elastomer comprising segments formed from the copolymer segment of Formula I $$A^1\text{-}[Y^1]_n\text{-}L\text{-}[Y^2]_q\text{-}A^2 \qquad \text{Formula 1}$$

wherein $A^1$ is an end capping group;

$A^2$ is hydrogen or an end capping group;

each $[Y^1]_n$ and $[Y^2]_q$ is independently selected from a polyether macrodiol, polycarbonate macrodiol, polyester macrodiol, and wherein at least one of $[Y^1]_n$ and $[Y^2]_q$ is a polyester macrodiol;

L is a divalent linking compound independently selected from urethane, urea, carbonate, ester, and phosphonate;

n is the number of monomer units $Y^1$ in the macrodiol and is an integer of 2 to 50, preferably from 2 to 20 and more preferably from 2 to 10, such as 2 to 5;

q is the number of monomer units $Y^2$ in the macrodiol and is an integer of 2 to 50, preferably from 2 to 20 and more preferably from 2 to 10 such as 2 to 5; and b) spraying the aqueous dispersion onto materials to be used in crop production to form a polymeric membrane on the materials.

The macrodiols will generally each have a weight average molecular weight molecular weight of at least 200 and preferably at least 250, such as from 200 to 5,000, from 250 to 5000 or from 250 to 2000.

In one set of embodiments, $[Y^1]_n$ and $[Y^2]_q$ are each polyester macrodiols.

In a preferred set of embodiments, the polyester macrodiol comprises an aliphatic polyester.

Preferably, the polyester macrodiol comprises at least one polyester selected from the group consisting of polylactic acid, poly(glycolic acid), polycaprolactone, polyvalerolactone, poly(hydroxyl valerate), poly(ethylene succinate), poly(butylene succinate), poly(butylene succinate adipate), poly(ethylene adiptae) poly(para-dioxanone) and polydecalactone.

The polyester macrodiol may also contain anionic species such as carboxyl groups.

In one set of embodiments, L is a urethane residue of a diisocyanate.

Preferably, the polyurethane or polyurethane-urea elastomer is a product of reaction of the copolymer segment of Formula 1 with a chain extender or a mixture of chain extenders. The polyurethane may optionally include one or more macridiols reacted with the copolymer segment of Formula 1 and the chain extender.

Preferably, the material used in crop production is selected from the group consisting of soil materials and granular compositions comprising agrochemically active agents.

Preferably, the material used in crop production is selected from the group consisting of granular materials comprising active agents selected from the group consisting of pesticides, plant growth regulators and fertilizers.

Preferably, the material used in crop production is an area of soil for growing crops.

In one set of embodiments, the polyether macrodiol is selected from polypropylene glycol, polyethylene oxide and poly(tetramethylene oxide) (PTMO), Preferably, $A^1$ and $A^2$ are each independently selected from hydroxyl and amine.

In a preferred set of embodiments, the weight average molecular weight range of the copolymer segment of Formula 1 is between about 500 and 10,000, or between about 1000 and 5000, or between about 1000 and 2000.

Preferably, the divalent linking compound L is selected from the group consisting of: hexamethylene 1,6-diisocyanate, 1,12-dodecane diisocyanate, 2,2,4-trimethyl-hexamethylene diisocyanate, 2,4,4-trimethyl-hexamethylene diisocyanate, 2-methyl-1, 5-pentamethylene diisocyanate, alkyl-lysine diisocyanate, dicyclohexlymethane diisocyanate, isophorone diisocyanate, 1,4-cyclohexane diisocyanate, 1,4-cyclohexane bis(methylene isocyanate), 1,3-bis(isocyanatomethyl) cyclohexane, and mixtures thereof.

Preferably, at least one chain extender is selected from: 1,4-butanediol, 1,6-hexanediol, 1,8-octanediol, 1,9-nonanediol, 1,10-decanediol 1,4-cyclohexane dimethanol, p-xylene glycol, 1,4-bis (2-hydroxyethoxy) benzene, 1,12-dodecanediol, ethylene diamine, ethanolamine, butane diamine or propane diamine, Preferably, the polyurethane or polyurethane elastomer is an ionic species comprising ionic groups selected from the group consisting of carboxylate, sulfonate and ammonium.

In one set of embodiments, the ionic groups are selected from the group consisting of pendant carboxylate, pendant sulfonate, pendent quaternary ammonium and intra-chain quaternary ammonium.

Suitably, the ionic groups are selected the group consisting of pendant carboxylate, pendent quaternary ammonium and intra-chain quaternary ammonium.

Preferably, the polyurethane or polyurethane elastomer is derived from reaction of a diisocyanate and at least one active hydrogen containing compound comprising an ionic or ionisable group which provides ionic groups on neutralisation.

Preferably, the ionic groups are provided by reactions with one or more monomers selected from the group consisting of 2,2-bis(hydroxymethyl) propionic acid (BMPA), tartaric acid, dimethylol butanoic acid (DMBA), glycollic acid, thioglycollic acid, lactic acid, malic acid, dihydroxy malic acid, dihydroxy tartaric acid, and 2,6-dihydroxy benzoic acid and neutralisation of the resulting polymer with a tertiary amine.

Preferably, the polyurethane or polyurethane-urea elastomer present in the aqueous dispersion is cross-linked by a suitable cross-linker selected from the group consisting of divalent and trivalent metal cations.

In one set of embodiments, the cross-linker is selected from the group consisting of $Ca^{2+}$, $Mg^{2+}Al^{3+}$ metal cations.

Preferably, the polyurethane or polyurethane-urea elastomer is present in the aqueous dispersion in an amount of from about 10% to about 40% by weight of the aqueous dispersion.

Preferably, the polyurethane or polyurethane-urea elastomeric composition is applied to soil materials at a rate of from about 0.25 kg to about 1.0 kg polyurethane or polyurethane-urea containing 10-40% solids content per square meter of material surface.

Preferably, the aqueous dispersion of the polyurethane or polyurethane-urea elastomer comprises one or more additional dispersed polymers selected from the group consisting of acrylic polymers, polyvinyl acetate, rubber latex, polysaccharides and gums.

Preferably, the aqueous dispersion of the polyurethane or polyurethane-urea elastomer is applied following application of a barrier layer adapted to reduce wicking of the polyurethane or polyurethane-urea elastomer into the soil.

Preferably, the aqueous dispersion of the polyurethane or polyurethane-urea elastomer is applied without a barrier layer to reduce wicking of the polyurethane or polyurethane-urea elastomer into the soil.

Preferably, the aqueous dispersion of the polyurethane or polyurethane-urea elastomer is applied into subsurface soil.

In one set of embodiments, the polyurethane or polyurethane-urea elastomer is biodegradable. Generally speaking, biodegradability will be provided by incorporation of at least a portion of polyester polyol or polyether polyol units in the polyurethane or polyurethane-urea elastomer.

In a further set of embodiments, there is provided a polymeric membrane for materials used in crop production formed by a process according to any one of the preceding paragraphs.

In a further set of embodiments, there is provided a method of mulching in agriculture comprising applying an aqueous dispersion of polyurethane or polyurethane-urea elastomer according to any one of the preceding paragraphs to an area of soil for use in crop production to form a mulch membrane and planting a crop before, during or after applying the aqueous dispersion. The crop, in a form such as seed or seedlings, may be planted through the membrane or the crop may be planted before application of the membrane.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DETAILED DESCRIPTION

Figure 1:
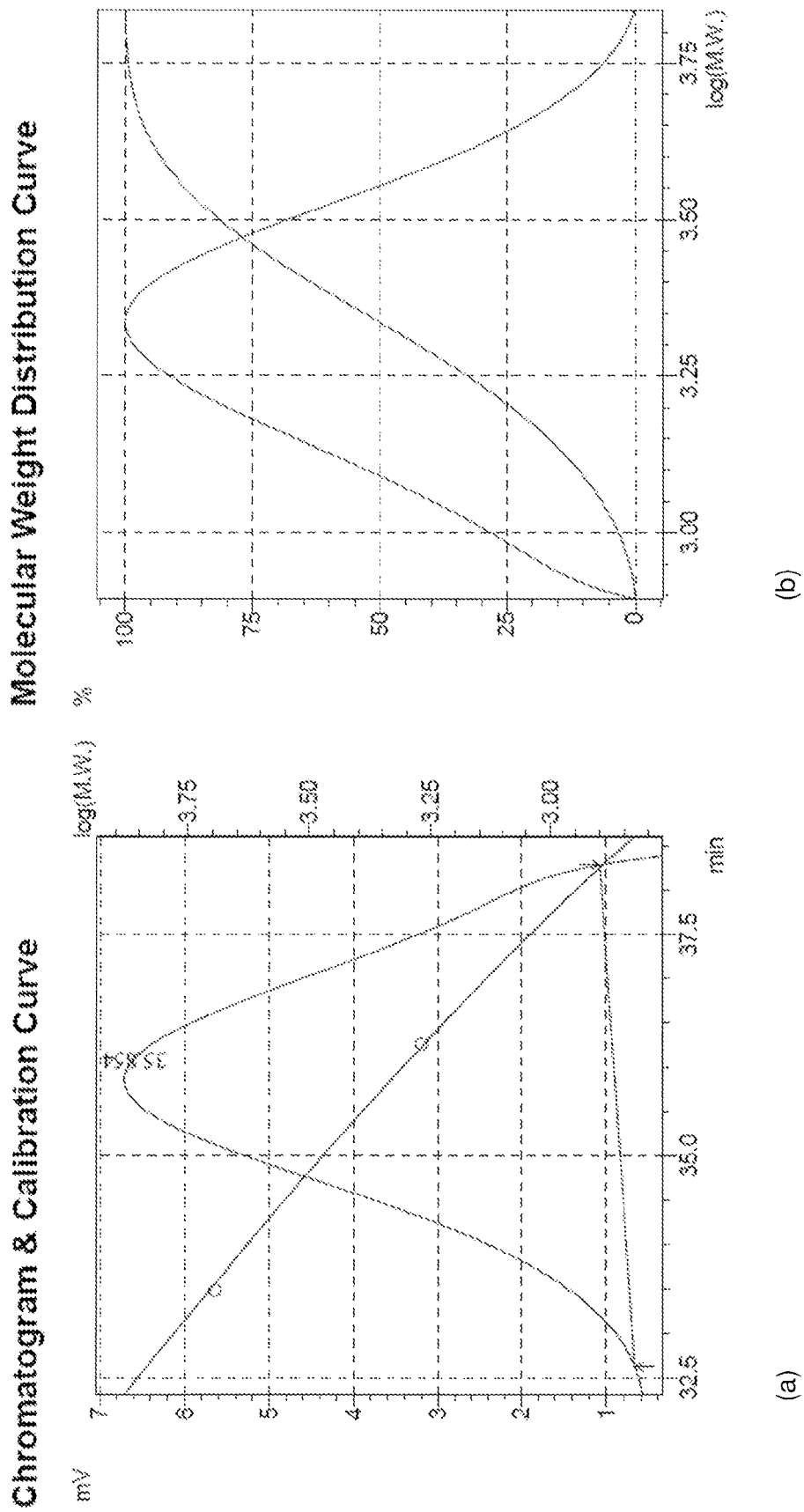
FIG. 1 includes two graphs (a) and (b) relating to the PCL before linking. Graph (a) shows a chromatogram and calibration curve and graph (b) a molecular weight calibration curve.
Figure 2:
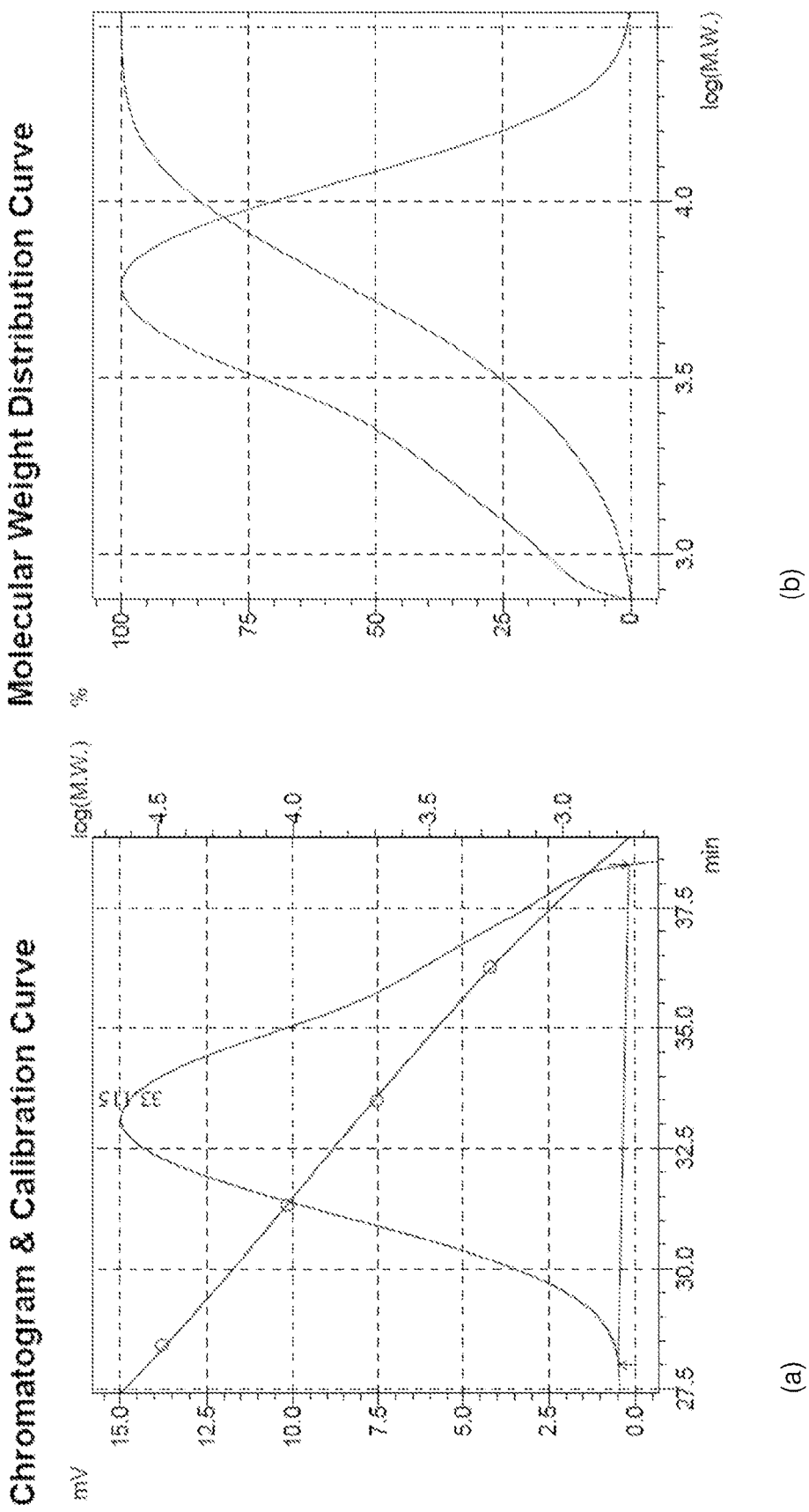
FIG. 2 includes two graphs (a) and (b) relating to linked PCL. Graph (a) shows a chromatogram and calibration curve and graph (b) shows a molecular weight distribution curve.

The present invention is predicated on the finding of a process for preparing a polymeric membrane by spraying an aqueous dispersion of a polyurethane or polyurethane-urea elastomer onto materials to be used in crop production to form said polymeric membrane on the materials. In particular, the polyurethane or polyurethane-urea elastomers are formulated from chemically linked (linked-macrodiols or macrodiamines) to contain one or more chemically distinct moieties within the polymeric backbone that afford the polyurethanes or polyurethane-urea elastomers with low modulus and high elasticity suitable for crop production.

Process

According to a first embodiment of the present invention, there is provided a process for preparing a polymeric membrane for materials used in crop production. The polymeric membrane is prepared according to step a) of the process, from an aqueous dispersion of a polyurethane or polyurethane-urea elastomer comprising segments formed from a copolymer segment of Formula 1,

$$A^1\text{-}[Y^1]_n\text{-}L\text{-}[Y^2]_q\text{-}A^2 \qquad \text{Formula 1}$$

wherein $A^1$ is an end capping group;

$A^2$ is hydrogen or an end capping group;

each $[Y^1]_n$ and $[Y^2]_q$ is independently selected from a polyether macrodiol, polycarbonate macrodiol, polyester macrodiol, and wherein at least one of $[Y^1]_n$ and $[Y^2]_q$ is a polyester macrodiol;

n the number of monomer units $Y^1$ in the macrodiol and is an integer of 2 to 50, preferably from 2 to 20 and more preferably from 2 to 10, such as from 2 to 5;

q is the number of monomer units $Y^2$ in the macrodiol and is an integer of 2 to 50, preferably from 2 to 20 and more preferably from 2 to 10, such as from 2 to 5;

L is a divalent linking compound independently selected from urethane, urea carbonate, ester, and phosphonate.

The process comprises as a first step, the step of combining:

i. at least one macrodiol;

with the divalent linking compound (L) to form the desired copolymer segment of Formula 1.

Herein, divalent linking compounds are compounds that can link two components, such as two macrodiols, whereby the divalent compound is at the nexus between the two components. A divalent linking compound can create: urethane, urea, carbonate, ester, and phosphonate linkages within the copolymer segment.

Optional additional steps in the process may include one or more of:
i. filtration;
ii. the removal of solvent(s), for example via evaporation under reduced pressure; and/or
iii. purification, for example by distillation (such as distillation via the use of Kugel Rohr distillation apparatus).

Once the copolymer segment of Formula 1 is formed, the process comprises as a second step, the step of preparing a polyurethane or polyurethane-urea elastomer composition comprising a reaction product of:
i. at least one copolymer segment of Formula 1 as defined herein;
ii. a diisocyanate or polyisocyanate;
iii. one or more chain extenders (CE); and
iv. optionally an additional polyol or polyamine.

In one set of embodiments, the polyurethane or polyurethane-urea elastomer may be prepared by reacting a diisocyanate with an active hydrogen containing monomer such as a dihydroxy polyol or diol to form an isocyanate terminated prepolymer.

In a preferred embodiment, the polyurethane or polyurethane-urea elastomer is prepared from a prepolymer formed by reaction of a polyol and isocyanate.

The active hydrogen containing monomer may comprise of ionic or ionisable pendent groups or the isocyanate capped prepolymer may be reacted with a chain extender to provide ionic or ionisable groups.

In one set of embodiments, the prepolymer is chain extended with a polyol, polyamide, polyamine or mixture thereof which may comprise ionic or ionisable pendent groups.

In one set of embodiments, the prepolymer is chain extended with a primary or secondary amine having at least two active hydrogens and which may be quaternized to provide cationic groups.

An aqueous dispersion of the resulting polyurethane or polyurethane-urea elastomer was produced according to step a) of the process, the details of which are provided in the Experimental Section below.

In one set of embodiments, the polyurethane or polyurethane-urea elastomer is present in the aqueous dispersion in an amount of from about 5% to about 60% by weight of the aqueous dispersion.

Once formed, the aqueous dispersion of the polyurethane or polyurethane-urea elastomer is then sprayed, according to step b) of the process, onto the materials to be used in the crop production to form said polymeric membrane on the materials.

Substituent $A^1$

Herein, substituent $A^1$ is an "end capping group" and includes reactive functional groups or groups containing reactive functional groups. Examples of suitable reactive functional groups for substituent $A^1$ include: hydroxyl groups, carboxylic acids, aldehydes, ketones, esters, acid halides, acid anhydrides, amine groups, imine groups, thiol groups, thioesters, sulphonic acids and epoxides.

$A^1$ may be selected from hydroxyl or amine. In one embodiment, $A^1$ is a hydroxyl group. In another embodiment, $A^1$ is an amine group.

Substituent $A^2$

Herein, substituent $A^2$ is hydrogen or an "end capping group" and includes reactive functional groups or groups containing reactive functional groups. Examples of suitable reactive functional groups for substituent $A^2$ include: hydroxyl groups, carboxylic acids, aldehydes, ketones, esters, acid halides, acid anhydrides, amine groups, imine groups, thiol groups, thioesters, sulphonic acids and epoxides.

A² may be selected from hydrogen, hydroxyl or amine. In one embodiment, A² is hydrogen. In another embodiment, A² is a hydroxyl group. In another embodiment, A² is an amine group.

Substituents $[Y^1]_n$ and $[Y^2]_q$

Polyols include but are not limited to diols, triols, and tetraols and macrodiols. Preferably, the polyol has a number-average molecular weight (Mn) of 500-10,000, preferably 500-2000 and more preferably 500 to 1000. The polyol may comprise further functional groups such as one or more selected from the group consisting of hydroxyl, thiol, carboxylic acid and amine groups.

The polyols which can be used in embodiments of the present invention include higher polymeric polyols such as polyester polyols and polyether polyols, as well as other acceptable "polyol" reactants, which have an active hydrogen component. Herein, each individual substituent $[Y^1]_n$ and $[Y^2]$ is independently selected from a polyether macrodiol, a polycarbonate macrodiol, and a polyester macrodiol.

One of $[Y^1]_n$ and $[Y^2]_q$ may be a polyether macrodiol. $Y^1$ may be a polyether macrodiol. $Y^2$ may be a polyether macrodiol.

Examples of suitable polyether macrodiols include, but are not limited to: polyethylene glycols (PEGs), polypropylene glycols (PPGs), poly(tetramethylene oxide) (PTMO) and copolymers.

At least one of $Y^1$ and $Y^2$ may be a polycarbonate macrodiol. $Y^1$ may be a polycarbonate macrodiol. $Y^2$ may be a polycarbonate macrodiol.

Examples of suitable polycarbonate macrodiols include, but are not limited to: poly(propylene carbonate), poly(hexamethylene carbonate) and polycarbonate and copolycarbonate macrodiols can be prepared by using an ester interchange reaction as described in P. A Gunatillake et al., *Journal of Applied Polymer Science*, 69(8) 1621-1633, 1998, for example by reacting a carbonate such as ethylene carbonate with a diol.

The polyester polyols are esterification products prepared by the reaction of organic polycarboxylic acids or their anhydrides with a stoichiometric excess of a polyol. At least one of $[Y^1]_n$ and $[Y^2]_q$ may be a polyester macrodiol. $[Y^1]_n$ may be a polyester macrodiol. $[Y^2]_q$ may be a polyester macrodiol.

In one set of embodiments, $[Y^1]_n$ and $[Y^2]_q$ are each polyester macrodiols.

In a preferred set of embodiments, the polyester macrodiol comprises an aliphatic polyester.

Examples of suitable polyester macrodiols include, but are not limited to: polylactic acid, poly(glycolic acid), polycaprolactone, polyvalerolactone, poly(hydroxyl valerate), poly(ethylene succinate), poly(butylene succinate), poly(butylene succinate adipate), poly(para-dioxanone) and polydecalactone.

Substituent L

Herein, substituent L is a divalent linking group independently selected from urethane, urea, carbonate, ester and phosphonate linking groups.

In one set of embodiments, L may be a urethane linking group.

Urethane linking groups can be produced by reacting hydroxyl containing compounds, such as a macrodiol, with a polyisocyanate.

The polyisocyanate used in embodiments of the present invention is preferably an aliphatic diisocyanate which is conducive to providing biodegradability.

Examples of suitable diisocyanates include aliphatic, cyclic or aromatic diisocyanates.

Specific examples of suitable aliphatic diisocyanates include those selected from the group consisting of hexamethylene 1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, alkyl-lysine diisocyanate (such as ethyl-lysine diisocyanate) and mixtures thereof. Specific examples of suitable cycloalipahtic polyisocyanates include dicyclohexylmethane diisocyanate, isophorone diisocyanate, 1,4-cyclohexane diisocyanate, 1,4-cyclohexane bis(methylene isocyanate), 1,3-bis(isocyanatomethyl) cyclohexane, and mixtures thereof.

In general, we have found isophorone diisocyanate (IPDI) or cyclohexane bis(methylene isocyanate), to be particularly useful in providing the desired properties of biodegradability and membrane formation properties to match the growing season of the crop.

In one set of embodiments, L may be a urea linking group.

Urea linking groups can be produced by reacting amine containing compounds, such as a macrodiamine, with a diisocyanate.

In one set of embodiments, L may be a carbonate linking group.

In one set of embodiments, L may be an ester linking group.

Examples of ester linking groups include, but are not limited to, esters formed through the reactions between alcohols and aliphatic or aromatic di-acid or diacid chloride containing compounds.

In one set of embodiments, L may be a phosphonate linking group.

The copolymer segment of Formula 1 according to any of the above described embodiments may have a molecular weight range between about 1000 and 10,000, or between about 1000 and 5000, or between about 1000 and 2000. Unless stated otherwise, herein the phrase "molecular weight" refers to the number-average molecular weight ($M_n$) of a particular polymer.

Catalyst

The reaction to form the prepolymer may be conducted in the presence of a catalyst such as selected from stannous octoate, dibutyltin dilaurate, di($C_1$-$C_4$ alkyl)tin dichlorides and tertiary amine compounds such as triethylamine and bis(dimethylaminoethyl) ether, morpholine compounds such as dimorpholinodiethyl ether, bismuth carboxylates, zinc bismuth carboxylates, iron (III) chloride, potassium octoate, potassium acetate, and DABCO® (bicycloamine).

Ionic or Ionisable Groups

Ionic groups are preferably incorporated into the polyurethane or polyurethane-urea elastomer to provide a stable water based dispersion. This allows the use of organic solvents to be minimised and assists in providing a resilient membrane on application to soil materials. Such polyurethane or polyurethane elastomers are derived from reaction of a diisocyanate and at least one active hydrogen containing compound comprising an ionic or ionisable group which provides ionic groups on neutralisation.Such ionic groups may include, but are not limited to: carboxylate, sulfonate and ammonium groups. In one set of embodiments, the ionic groups are selected from the group consisting of pendant carboxylate, pendant sulfonate, pendent quaternary ammonium and intra-chain quaternary ammonium. Suitably, the ionic groups are selected the group consisting of pendant carboxylate, pendent quaternary ammonium and intra-chain quaternary ammonium. In one set of embodiments the ionic groups are derived from a monomer selected from the group consisting of

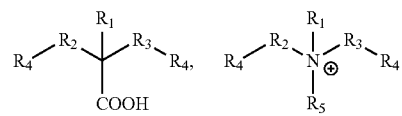

and mixtures thereof, where: $R_1$ is an alkyl group of 1 to 4 carbons;

$R_2$ and $R_3$ are independently selected from the group consisting of alkyl diradical groups of 1 to 4 carbon atoms; aryl diradical groups; aralkyl diradical groups; polyester diradical segments and polyether diradical segments;

$R_4$ is hydroxyl (OH) or primary amine ($NH_2$); and $R_5$ is independently selected from the group consisting of alkyl groups of 1 to 18 carbon atoms; aryl groups; aralkyl groups.

In more specific embodiments the ionic groups are provided by reactions with one or more monomers selected from the group consisting of 2,2-bis(hydroxymethyl) propionic acid (BMPA), tartaric acid, dimethylol butanoic acid (DMBA), glycollic acid, thioglycollic acid, lactic acid, malic acid, dihydroxy malic acid, dihydroxy tartaric acid, and 2,6-dihydroxy benzoic acid and neutralisation of the resulting polymer with a tertiary amine.

The acid ionisable groups are generally incorporated in the polymer or prepolymer in an inactive form and activated by a salt-forming compound such as a tertiary amine. Neutralization of the polymer or prepolymer having dependent carboxyl groups with the tertiary amine converts the carboxyl groups to carboxylate anions, thus having a solubilizing effect. Suitable tertiary amines, which can be used to neutralize the polymer include organic tertiary amine bases such as triethylamine (TEA), N-methyl morpholine and inorganic bases sodium hydroxide or ammonia. The preferred tertiary amine is triethylamine (TEA). It is recognized that primary or secondary amines may be used in place of tertiary amines, if they are sufficiently hindered to avoid interfering with the chain extension process.

Aqueous dispersions of cationic polyurethane or polyurethane-urea elastomers may be prepared using chain extenders which comprise of secondary amines. For instance, an N-alkyl dialkanolamine such as N-methyl diethanolamine (MDEA) may be used as a chain extender (CE) and then the product quaternised by reacting with a quaternising agent. Cationic polyurethanes may also be prepared having tertiary amine groups tethered to the polyurethane or polyurethane-urea backbone. Such cationic polyurethanes or polyurethane-urea elastomers may be prepared from polyols substituted with side chains comprising a tertiary amine group which may be quaternised and neutralised with an organic acid such as formic acid, acetic acid, propionic acid, succinic acid, glutaric acid, butyric acid, lactic acid, malic acid, citric acid, tartaric acid, malonic acid and adipic acid; organic sulfonic acids such as sulfonic acid, para-toluene sulfonic acid and methanesulfonic acid; inorganic acids such as hydrochloric acid, sulfuric acid, nitric acid, phosphoric acid, boric acid, phosphorous acid and fluoric acid.

We have found that the ionic groups provide emulsifier properties which assist in forming a stable membrane and it helps polymer dispersion in water. The method of synthesis and its amount may dictate the emulsion properties such as viscosity, particle size and subsequent physico-mechanical membrane properties. Cationic polyurethanes or polyurethane-urea elastomers provide strong adhesion properties on anionic surfaces.

Additional Macrodiol

The polyurethane or polyurethane-urea elastomer may comprise, in addition to the segments of formula I, further monomer units derived from macrodiol Preferably the additional macrodiol, where present, has a number-average molecular weight ($M_n$) of 250-10,000, preferably 250-2000 and more preferably 500 to 1000. The macrodiol may comprise further functional groups such as one or more selected from the group consisting of hydroxyl, thiol, carboxylic acid and amine groups.

The additional macrodiols which can be used in the present invention includes higher polymeric polyols such as polyester polyols and polyether polyols, polyhydroxy polyester amides, hydroxyl containing polycaprolactones, hydroxy-containing acrylic interpolymers, hydroxy-containing epoxies, and hydrophobic polyalkylene ether and carbinol type polydimethylsiloxane polyols.

Examples of polyether polyols include polyethylene glycols (PEGs) and polypropylene glycols (PPGs) and copolymers.

The polyester polyols are esterification products prepared by the reaction of organic polycarboxylic acids or their anhydrides with a stoichiometric excess of a polyol. Examples of suitable polyols for use in the reaction include polylactic acid polyol, polyglycolic polyol, polyglycol adipates, polyethylene terepthalate polyols, polycaprolactone polyols, orthophthalic polyols, and sulfonated polyols, etc. The polycarboxylic acids and polyols are typically aliphatic or aromatic dibasic acids and diols. The diols used in making the polyester include alkylene glycols, e.g., ethylene glycol, butylene glycol, neopentyl glycol and other glycols such as bisphenol A, cyclohexane diol, cyclohexane dimethanol, caprolactone diol, hydroxyalkylated bisphenols, and polyether glycols.

Specific examples of polyurethane or polyurethane-urea elastomer which comprise, in addition to the segments of formula I, further monomer units derived from a macrodiol include the polymers set out in Table 1

TABLE 1

Use of two different polyol segments combinations in the formulation of TPU or TPPUU compositions.

| Linked polyol 1 | Polyol2 |
|---|---|
|  | 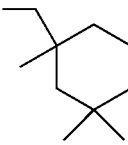 Poly(caprolactone)diol |
|  | 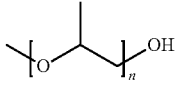 Poly(propylene glycol) |

Scheme 1: Showing PUU synthesis scheme using linked PCL polyol
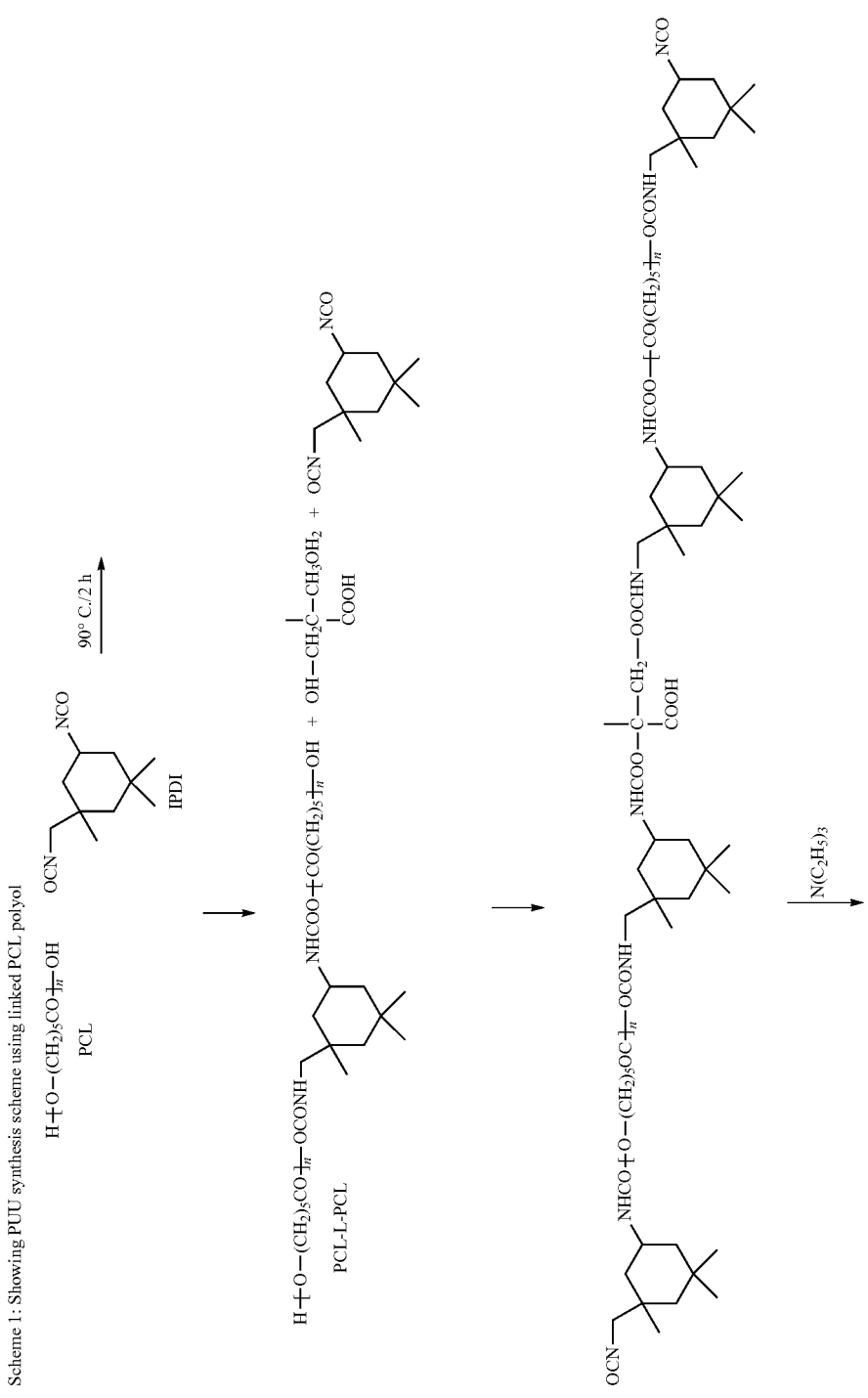

-continued
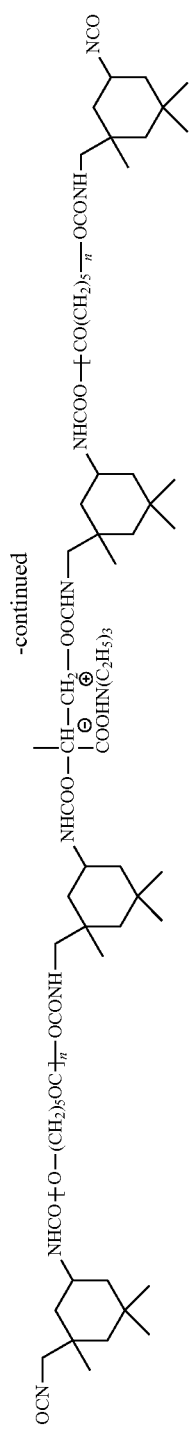
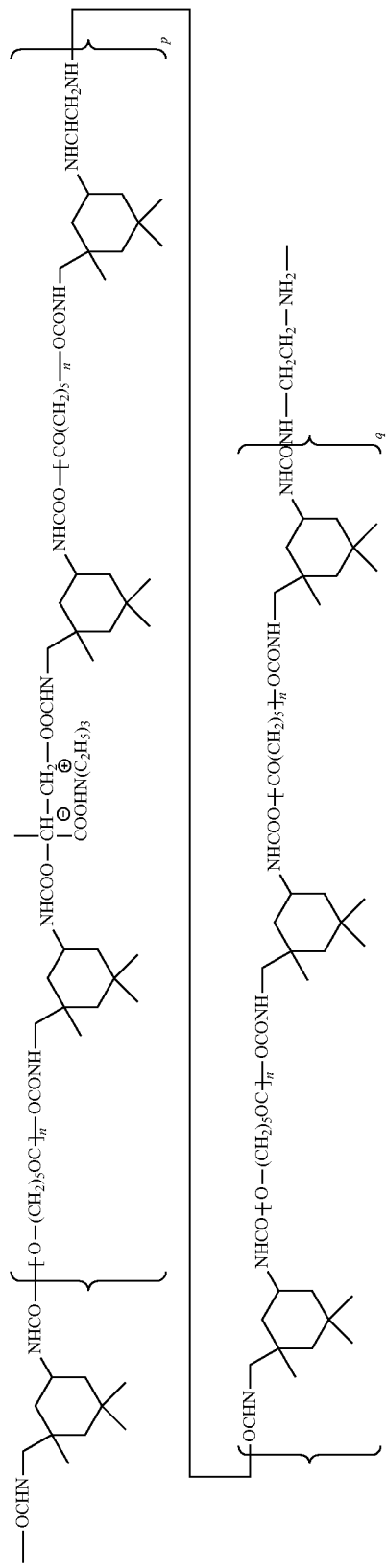

Chain Extenders

A chain extender (CE) is a compound that has two functional groups per molecule, such as diols or diamines, which are capable of reacting with an isocyanate group. The chain extender may be selected from diol or diamine chain extenders. In one embodiment at least one chain extender is a diol. Herein, at least one chain extender (CE) is included in the formation of the polyurethane or polyurethane-urea elastomer compositions according to embodiments of the present invention. In one set of embodiments, the chain extender may have a molecular weight range of 500 or less. In a further set of embodiments, chain extender may have a molecular weight range of about 60 to about 200.

Examples of diol chain extenders include, but are not limited to: $C_{1-12}$ alkane diols such as: 1,4-butanediol, 1,6-hexanediol, 1,8-octanediol, 1,9-nonanediol and 1,10-decanediol, 1,4-cyclohexane dimethanol, p-xylene glycol, 1,4-bis (2-hydroxyethoxy) benzene and 1,12-dodecanediol.

Examples of diamine chain extenders include, but are not limited to: ethylene diamine (EDA), ethanolamine, butane diamine and propane diamine.

Also suitable for practice in embodiments of the present invention are di-ethylenetriamine (DETA), meta-xylene diamine (MXDA), and aminoethyl ethanolamine (AEEA), hexamethylene diamine, cyclohexylene diamine, phenylene diamine, tolylene diamine, xylene diamine, 3,3-dichlorobenzidene, 4,4-methylene-bis (2-chloroaniline), and 3,3-dichloro-4,4-diamino diphenylmethane. The wt % of a hard segment (HS) in a polyurethane or polyurethane-urea elastomer (the wt % determined by the weight of a linking compound (for example a diisocyanate)+chain extender as a percentage of the total weight of the polyurethane/polyurethane-urea elastomer) may be in a range of about 10 wt % to about 40 wt %. Exemplified ranges include: about 20 wt % to about 40 wt %, or about 40 wt %.

In one embodiment, only one chain extender is used in the formation of the polyurethane or polyurethane-urea elastomer composition.

In one embodiment, two chain extenders are used in the formation of the polyurethane or polyurethane-urea elastomer composition.

Crosslinkers

In one embodiment, the polyurethane or polyurethane-urea elastomer present in the dispersion is cross-linked by addition of a suitable ionic cross-linker. Example of suitable cross linkers may be selected from the group consisting of any divalent or trivalent cations such as $Ca^{2+}$, $Mg^{2+}Al^{3+}$ for ionic polymers.

The polyurethane or polyurethane-urea elastomer can also be crosslinked covalently using hydroxy or amines chain extenders containing more than two functional groups or slight excess of diisocyanate or polyisocyanate.

Crosslinking is preferred in the polyurethane (PU) or polyurethane-urea (PUU) structure. In contrast, acrylics which are crosslinked are generally non-degradable. Most PU or PUU coating spray examples comprise of thermoplastic formulations with slightly crosslinked structure to reinforce mechanical properties achieved with slight excess of isocyanate.

We have found that a cross-linker, particularly an ionic or non-ionic covalent crosslinker, may be used in an amount of, for example, in the range of from 2 to 20 mol % of the polyurethane or polyurethane-urea elastomer.

We have found that the cross-linked polyurethane or polyurethane-urea elastomer provides better membrane formation and is more resilient. The crosslinking factor reduces wicking on soil and improves membrane formation and mechanical integrity. It also helps to control properties such as water absorption and permeability, solubility, viscosity, particle size and biodegradability. In the PU or PUU formulations, we have found it advantageous to use a slight excess of isocyanate to provide crosslinking.

Polymeric Membrane

The polymeric membranes formed in accordance with the present invention are generally biodegradable. The rate of biodegradation of the membranes may be controlled by the selection of polyol units within the polymer. In general, the biodegradability of a polyurethane or polyurethane-urea elastomeric membrane will be dependent on the type and proportion of polyol type(s) used. The polyether-based polyurethanes or polyurethane-urea elastomers are generally more resistant to biodegradation whereas the polyurethanes or polyurethane-urea elastomers containing polyester polyol monomers are more readily degraded. The degradation rate generally increases with increasing polyester segment length and decreasing hard segment (HS) wt %. In addition, polyurethanes or polyurethane-urea elastomers derived from asymmetric aliphatic diisocyanates are generally degraded faster than those derived from symmetrical aliphatic or aromatic diisocyanates. This combination of factors may be used to tune the rate of degradation of the polyurethane or polyurethane-urea elastomer membrane so as to match the period of effective membrane required for crop production.

In some cases, a membrane may be required only during establishment of crops over a relatively short period of two or three months. In other situations, the membrane may be required for a more prolonged growing period in which case a lower rate of biodegradation is preferred. The biodegradation will generally be tailored to provide degraded polymer segments of average molecular weight (Mn) of 500 or less.

The biodegradability of polymers in soil is generally measured by monitoring the peak intensity of functional groups in the degraded membrane by IR, mass loss or molecular weight loss (Annals of Microbiology, 58 (3) 381-386 (2008) or by measuring the $CO_2$ emission from the soil under controlled conditions during degradation (Muller et al., 1992), Chemical Engineering Journal 142 (2008) 65-77.

Membrane Properties

The ionic polyurethane or polyurethane-urea dispersion generally provides a membrane having elastomeric properties.

The polymeric membrane is required to possess good elasticity in order to help improve membrane formation on rough soil surfaces and to help hold soil particles together during soil movement resulting from a change in environmental conditions.

Example conditions which may be used to measure the tensile strength of a sample with ASTM D 882-02 method are:

using dumbbell shaped specimens which are 75 mm in length, 13 mm in width at each end and 4 mm at the central narrow section (with a constant width over at least 15 mm of length); and using an Instron 5565 fitted with static load cell ±100 N and calibrated using Instron Bluehill 2 (version 2.35) software.

For the tensile test with dry conditions, the specimen may be:

fixed between upper and lower grips (for example Instron grips) such that the gap between the grips is 10 mm;

stretching the 10 mm long section of film at a rate of 50 mm per minute until the film breaks;

performing at least three replicates, for example three, four or five replicates.

Crop Production

The polymeric membrane is applied to soil materials by spray application. In general, the membrane may be applied using spray equipment commonly used in agriculture in applying crop protection compositions. The polyurethane or polyurethane-urea elastomeric composition is generally applied to soil materials at a rate of about 0.25 kg to about 1.0 kg polyurethane or polyurethane-urea elastomer formulation containing 10 to 40% solid content per square meter of soil materials.

The polyurethane or polyurethane-urea elastomer dispersion may be applied to a surface area of soil or may be applied below the soil surface. The polyurethane or polyurethane-urea elastomer dispersion may be applied prior to planting of seeds or plants or after planting of seeds or plants. It may be preferred in the case of seeds that the membrane be applied after seed placement to reduce loss of seeds.

In one set of embodiments, the polyurethane or polyurethane-urea elastomer membrane is applied below the surface of the soil or on the surface of the soil using farming equipment such as machinery used in tillage and seeding of commercial food crops. For example, in one embodiment, the polyurethane or polyurethane-urea elastomeric composition is applied below the soil surface during seed placement. The polyurethane or polyurethane-urea elastomer may be deployed before seed, together with seed or after seed. It may be contacted with seeds during or after the deployment of seeds. Alternatively, the polyurethane or polyurethane-urea elastomer aqueous dispersion may be applied to soil adjacent, such as directly covering the placed seeds, using such a combination mechanical seeder which may be, for example, a gravity or pneumatically fed seeder. The polyurethane or polyurethane-urea elastomer may be applied using an applicator attached to co-operate with a tilling implement to provide a membrane above and adjacent the placed seed. In one embodiment, the seed and polyurethane or polyurethane-urea elastomer aqueous dispersion are each contained in separate tanks each connected to feeder conduits for delivering contents to separate outlets behind the tilling implement. The seed delivery conduit delivers seed behind the tilling implement as the tilling implement moves forward to create a furrow in the ground surface. The seed emerging from the conduit outlet is deposited into the furrow. Gravity and/or a cooperating roller wheel may cause the furrow to collapse to a certain extent and the polyurethane or polyurethane-urea elastomer emulsion outlet to the rear of seed outlet may deposit the polyurethane or polyurethane-urea elastomer over the seed or the soil covering adjacent to the seed.

In a further embodiment, the polyurethane or polyurethane-urea elastomeric membrane is applied to an area of soil prepared for crops such as vegetables and seedlings or seeds are planted into soil to which the membrane has been applied.

In one set of embodiments, the polyurethane or polyurethane-urea elastomeric composition may be applied with or without the application of a barrier layer to reduce wicking of the polyurethane or polyurethane-urea elastomer into the soil.

Additives

The polyurethane or polyurethane-urea elastomeric composition may further comprise a thickening agent to increase the viscosity of the composition. Alternatively a thickening agent may be applied to soil prop to or at the same time as the composition. Examples of thickening agents include polysaccharide thickening agents including starches; galactomannan gums such as guar gum, locus bean gum and xanthan gum; gelatin, wood meal, cellulose, cellulose derivatives such as alkyl ethers including methyl and ethyl cellulose, hydroxyalkyl ethers such as, hydroxylmethyl cellulose (HMC), hydroxyethyl cellulose (HEC) and hydroxylpropyl methyl cellulose (HPMC), carboxyalkyl ethers of cellulose such as carboxymethyl cellulose (CMC) and organic esters of cellulose; and alginate including alginic acid and salts thereof. Other examples of thickening agents include synthetic polymers such as polyacrylamide and polyacrylates and clays such as bentonite, attapulgite and silicates. In one set of embodiments such examples of thickening agents are included in the composition. In one set of embodiments the thickening agent is blended with the polymer composition in an amount in the range of from 1 to 20 wt % preferably 1-5 wt % and most preferably between 1-2 wt %. In one set of embodiments the viscosity of the composition is no more than 200 mPa·s and in a preferred set of embodiments the viscosity is in the range of from 50 to 200 mPa·s. The viscosity values were determined by using Brookfield DV-II+Programmable viscometer. The measurements were taken at room temperature (20-25° C.) using spindle No. 2 over different rotation speeds (rpm).

In one set of embodiments, the polyurethane dispersion further comprises one or more additional dispersed polymers. Examples of additional dispersed polymers may be selected from the group consisting of non-ionic polyurethanes, acrylic polymers, polyvinyl acetate, rubber latex, polysaccharides and gums. In one set of embodiments, the polyurethane dispersion further comprises an anionic polysaccharide such as alginic acid or salt thereof. The additional polymer or polymers may in one set of embodiments comprise in the range of from 3 to 50% by weight of the composition and the weight ratio of additional polymers to polyurethane may be in the range of from 1:0.5 to 3:1.

The composition may comprise plant nutrients such as fertiliser components. Examples of fertiliser components include nitrogen phosphorus and potassium fertiliser. In a particularly preferred embodiment the composition comprises a nitrogen fertiliser such as urea. Commercial liquid urea compositions are available which may be mixed with the urethane dispersion. Generally, however, we have found that controlled release of urea fertiliser is achieved if the urea is incorporated with a monomer component such as a polyol monomer used in preparation of a prepolymer. Accordingly in one set of embodiments urea uniform granules <100 microns or powders is mixed with a polyol and isocyanate is reacted with the polyol in admixture with urea to form the prepolymer. The prepolymer may be reacted with a chain extender to provide the polyurethane without unduly affecting the polyurethane preparation. The incorporation of urea in this manner was found to provide good controlled release of nitrogen in the soil during use and degradation of the membrane and to allow application of the composition as a spray. Generally urea is present in a weight ratio of polyurethane to urea in the range of from 10:1 to 200:1. The urea may compromise the strength and useful life of the membrane if present in too great quantities but generally the amount of urea can be determined in accordance with the requirements for nitrogen supplementation and mulch life in specific circumstances.

The polyurethane or polyurethane-urea elastomeric composition may comprise fillers, pigments or colouring agents. In one embodiment, the polyurethane composition comprises a humate such as potassium humate. Potassium humates are available commercially including K-HUMATE S-90® (available from Omnia Specialties Australia Pty Ltd). In one set of embodiments, the polymer solution is blended with the filler, particularly potassium humate, in a weight ratio of polyurethane polymer solution to filler in the range of from 1:0.01 to 1:0.1. The use of humate provides a black film on application to soil which is useful in increasing the temperature of the soil and promoting plant growth. The Black or dark brown colouring also of humates assist in the mulching function of the membrane by controlling growth of weeds and competition from other plants. Humates also have properties as fertiliser and plant growth stimulant and on degradation of the film provide soil conditioning.

The polyurethane or polyurethane-urea elastomeric compositions may also comprise silica like fillers such as fumed silicates exemplified by the Cab-O-Sil® M-5 product available from Multichem Pty Ltd. The silica filler is preferably used in a weight ratio of polyurethane polymer solution to filler in the range from 1:0.01 to 1:0.1. The higher number of surface silanol groups help in miscibility with water and increase the viscosity as well. The use of silicate provides hydrophobicity to films which is useful in reducing the water loss and promoting plant growth.

EXAMPLES

The polyurethane or polyurethane-urea elastomeric composition may be applied directly to soil and may be applied in a single or multiple applications such as one, two or three spray applications to the same area of soil. In particularly absorbent soils such as sandy soils, the polyurethane or polyurethane-urea elastomer may be drawn into the soil and form a less effective membrane. In such cases, multiple applications may be useful. In one set of embodiments, which may be particularly useful in sandy soils, the polyurethane or polyurethane-urea elastomer aqueous dispersion is applied following application of a primer adapted to reduce wicking of the polyurethane or polyurethane-urea into the soil.

Useful primer layers may include one or more materials selected from the group consisting of anionic polysaccharides such as alginate salts.

The polyurethane or polyurethane-urea elastomeric composition may comprise one or more additives such as dyes, fillers and agrochemically active agents. Examples of such agrochemicals may include pesticides, plant growth regulators, plant nutrients and fertilizers. The incorporation of such additives may allow their controlled release to the soil or immediate growing environment of the plants from the membrane during crop production.

Pesticides may include one or more selected from the group consisting of herbicides, insecticides, fungicides, nematodicides and molluscicides.

Examples of herbicides which may be included may be selected from the group consisting of FOPs, DIMs, sulfonyl ureas, synthetic auxins, dinitroanilines and quinolone carboxylic acids.

Examples of insecticides include carbamates, triazemates, organophosphates, cyclodiene organochlorines, fiproles, methoxychlor, pyrethroids, pyrethrins, neonicotinoids, nicotine, spinosyns, Bt, benzoylureas and the like.

Examples of fungicides include metalaxyl, mefenoxam, azoxystrobin captan, thiabendazole, fludiaxonil, thiram, PCNB, potassium bicarbonate, copper fungicides and *Bacillus subtilis*.

Examples of nematodicides include avermectins, carbamates, oxime carbamates, organophosphorus nematodicides.

The polymeric membrane produced according to embodiments of the present invention may allow continuous release to provide or supplement plant protection during the growing season and reduce or eliminate the need for additional use of agrochemicals.

The composition may be applied to any of a wide range of soil formations used in agriculture such as raised beds, pastures, ridges, furrows and irrigation channels. The invention is useful on a wide range of soil types and soil classifications such as referred to in the World Reference Base of Soil Resources.

EXAMPLES

Polymer Sprayable Formulation

The following polyurethane sprayable membranes may be prepared using the general procedures outlined below.

EXPERIMENTAL SECTION

Abbreviations
BMPA=2,2-Bis(hydroxymethyl)propioninc acid
DTAB=n-Dodecyltrimethylammoniumbromide
EDA=Ethylenediamine
BDO=1,4-butane diol
MDEA=N-methyldiethanol amine
DICAP=polyester polyol containing acid functionality
PUU=Polyurethane-urea
PU=Polyurethane
CMC—Carbomethoxy cellulose
Latex (Natural both crosslinked and Raw)
PPG=Polyproylene glycol
IPDI=Isophorone diisocyanate
SDDS=Sodium dodecylsuplfate
AcOH=Glacial Acetic acid
PP=Prepolymer
SS=Soft segment
HS=Hard segment
CE=Chain extender
L=Linker Test Procedure Particle size was measured using a Wyatt Dyna Pro Plate Reader Wyatt Technology Corporation, 6300 Hollister Ave, Santa Barbara, Calif. 93117-3253. The viscosity of polymer solution was measured by Brookfield digital rotary viscometer, model 94800-0.

Gel permeation chromatography (GPC) was performed on a Waters Alliance system equipped with an Alliance 2695 Separations Module (integrated quaternary solvent delivery, solvent degasser and autosampler system), a Waters column heater module, a Waters 2414 RDI refractive index detector, a Waters PDA 2996 photodiode array detector (210 to 400 nm at 1.2 nm) and 4× Agilent PL-Gel columns (3× PL-Gel Mixed C (5 um) and 1× PL-Gel Mixed E (3 μm) columns), each 300 mm×7.8 mm², providing an effective molar mass range of 10 to 4×10$^5$). Tetrahydrofuran (THF) high purity solvent (HPLC grade) was pre-filtered through aluminium oxide (90 active neutral, 70-230 mesh) equipped with a 0.45 μm filter, and 0.1 g L$^{-1}$ 2,6-di-tert-butyl-4-methylphenol (BHT) was added as inhibitor. The filtered THF containing BHT was purged slowly with nitrogen gas and used as an eluent with a flow rate of 1 mL/min at 30° C. Number ($M_a$) and weight average ($M_w$) molar masses were evaluated using Waters Empower-3 software. The GPC columns were calibrated with low dispersity polystyrene (PSt) standards (Polymer Laboratories) ranging from 265 to 2,560,000 g mor$^{-1}$, and molar masses are reported as PSt equivalents. A 3rd-order polynomial was used to fit the log $M_p$ vs. time calibration curve, which was near linear across the molar mass ranges.

GPC measurements of other polymers were performed on a Shimadzu system equipped with a CMB-20A controller system, a SIL-20A HT autosampler, a LC-20AT tandem pump system, a DGU-20A degasser unit, a CTO-20AC column oven, a RDI-10A refractive index detector and with 4 Waters Styragel columns (2*HT3, HT4, HT5 each 300× 7.8 mm) providing an effective molar mass range of 100-4×10$^6$) and with N,N-dimethylacetamide (DMAc) containing 2.1 g·L$^{-1}$ of lithium chloride (LiCl) as eluent with a flow rate of 1 mL·min$^{-1}$ at 80° C. The molar masses in poly (methyl methacrylate) (PMMA) equivalents were obtained from a calibration curve constructed with low dispersity PMMA standards (Polymer Laboratories). A third-order polynomial was used to fit the log $M_p$ versus time calibration curve, which was approximately linear across the molar mass range from 1,020 to 1,944,00 g·mol$^{-1}$.

DSC was performed on a Mettler Toledo DSC821 using samples (~5 mg weight) at a heating rate of 10° C./min under nitrogen purge. The samples were stored for 48 h under a vacuum at room temperature (RT) (0.1 Torr) prior to analysis. Tensile testing was performed on an Instron Model 4468 universal testing machine following the ASTM D 882-02 test method at ambient temperature (23° C.) with humidity of around 54%.

Film preparation by solvent casting and testing of mechanical properties: Polymer films of 80 mm×145 mm size were prepared by placing a solution of the polymer in a Teflon mould and then evaporating the solvent slowly in a nitrogen circulating oven at 60° C. for few hours followed by further drying under a vacuum (1 torr) overnight. The films were then equilibrated at room temperature for at least 24 hrs before using them for tensile property measurement. Dumbbell shaped specimens of polymer film were punched using a die and a manual cutting Press (IDM Instruments). The specimens had dimensions of 75 mm length, 13 mm width at each end and 4 mm at the central narrow section (constant width over at least 15 mm of length). Thickness of the cut out specimen was measured using a digital thickness gauge (Mitutoyo, Japan). In case there was small variation in thickness over the length of 15 mm in the central narrow section, an average of three thickness values was taken. Instron 5565 fitted with static load cell ±100 N was initialized and the load was calibrated using Instron Bluehill 2 (version 2.35) software. For the tensile test at dry condition, the specimen was fixed between upper and lower grips (Instron) such that the gap between the grips was 10 mm. The 10 mm long section of the film was stretched at the rate of 50 mm per minute until the film broke. At least three replicates of specimen were tested for each film. In case of wide discrepancy between results, five tests were carried out.

Biodegradation

The biodegradation assessment was carried out in both laboratory and field conditions. The laboratory (24 months maximum) test was carried out using aerobic biodegradation test by standard test method ASTM 5988-12. Test set up included three replicates for each: the blank (soil only), the test material 200-1000 mg polymer and the reference material 200-1000 mg for 500 g soil. Test conditions were maintained at a temperature range of 20° C.-28° C., pH 6-8, and moisture content 80-100% of moisture holding capacity of soil. The biodegradation was measured from the cumulative amounts of carbon-dioxide released from each bioreactor each day and percentage biodegradation $D_t$ was calculated (for the plastic test material and the reference material) for each point of time when the measurements were made, using Equation $$D_t = \frac{(CO_2)_T - (CO_2)_B}{THCO_2} \times 100$$

where, $(CO_2)_T$ is the cumulative amount of carbon dioxide evolved in each bioreactor containing test material (in grams per bioreactor); $(CO_2)_B$ is the mean cumulative amount of carbon dioxide evolved in the blank vessel (in grams per bioreactor). Following this step, the cumulative amount of carbon dioxide evolved as a function of time and percentage biodegradation as a function of time will be plotted for the test material and the reference materials Materials Natural latex rubber (Water emulsified, "Sprayable Latex" with 40.2% solids content was received from Barnes, Sydney. Sodium Alginate was received as powder from Melbourne Food Depot, Victoria.

Polymer Sprayable Formulation

Linked (functionalized) polyols and polyurethane-urea elastomers may be prepared using the general procedures outlined below.

Linked Polyol Synthesis

General Method

Polyol was dried and degassed by heating at 105° C. under vacuum (0.1 torr) until the moisture content is below 200 ppm as determined by Karl Fisher titration. Accurately weighed diisocyanate was placed in a round bottomed flask equipped with a mechanical stirrer, addition funnel and a nitrogen inlet. The flask was then placed in an oil bath at 90° C. The pre-dried and weighed polyol was then added to the diisocyanate with stirring. The reaction mixture was reacted for about 2 hours until all isocyanate was consumed, confirmed by the absence of the IR absorption band at 2275 cm$^{-1}$, corresponding to the NCO peak.

PUU Synthesis: General Method

Two-Step Method

Appropriate amount degassed linked polyol was weighed into a three neck RB flask equipped with an overhead mechanical stirrer, dropping funnel and nitrogen inlet. The flask was heated in an oil bath at 90° C.

Pre-dried solid BMPA was added to the above polyol quickly and heating continued for 1 h at 90° C. until it all BMPA dissolved. In case of liquid ionic species such as N-methyl-diethanolamine (the heating is not necessary). Accurately weighed quantity of IPDI was then added to the flask and heated for 4 hrs at above temperature. The flask was cooled down to 60° C. and reacted in the presence of an appropriate acid or base for 30 mins. The reaction mixture was further cooled down ambient temperature and deionised water containing an appropriate surfactant was then added to obtain an emulsified prepolymer solution. Accurately weighed amine CE diluted in water was added dropwise to this solution and stirring was continued until the NCO peak disappeared. The water dispersible polymer emulsion was then transferred to a screw-tight container and stored at ambient temperature. Other experiments with PUU index 1.01 and 1.03 were carried out under similar conditions.

Example 1

Synthesis of urethane-linked poly(caprolactone)diol (PCL-L-PCL)

PCL (MW 963.2) was dried and degassed by heating at 105° C. for about 15 hours under vacuum (0.1 torr) until the moisture content is below 200 ppm as determined by Karl Fisher titration. All glassware used was dried overnight at 105° C. before using in the experiment. Accurately weighed 5-isocyanato-1-(isocyanatomethyl)-1,3,3-trimethyl-cyclohexane, IPDI (1.19 g) was placed in a round bottomed flask equipped with a mechanical stirrer, addition funnel and a nitrogen inlet. The flask was then placed in an oil bath at 90° C. Pre-dried PCL (10.31 g) was weighed and added to IPDI with stirring. The reaction mixture was further reacted for about 2 hours until all isocyanate was consumed, confirmed by the absence of the IR absorption band at 2275 cm$^{-1}$.

Gel permeation chromatography (GPC) results shown in Table 2 and FIG. 1 confirmed increase in PCL molecular weight after linking with IPDI. The number average molecular weight of PCL before and after linking was determined by GPC and hydroxyl number.

TABLE 2

| Macrodiol | $M_n$ | $M_w$ | PDI |
| --- | --- | --- | --- |
| PCL - Before Linking | 1980 | 2341 | 1.18 |
| PCL - After Linking (Urethane) | 3845 | 6188 | 1.45 |

The urethane-linked-PCL-L-PCL was stored under nitrogen at ambient temperature until further use.

Example 2

Synthesis of urethane-linked poly(propylene)diol (PPG-L-PPG)

Linked PPG diols (MW 1000) was also prepared following the method described in Example 1. Accurately weighed 5-isocyanato-1-(isocyanatomethyl)-1,3,3-trimethyl-cyclohexane, IPDI (1.11 g) was placed in a round bottomed flask equipped with a mechanical stirrer, addition funnel and a nitrogen inlet. The flask was then placed in an oil bath at 90° C. Pre-dried PPG (10.0 g) was weighed and added to IPDI with stirring. The reaction mixture was further reacted for about 2 hours until all isocyanate was consumed, as confirmed by the absence of the IR absorption band at 2275 cm$^{-1}$. The number average molecular weight of PPG before and after linking was determined by GPC and confirmed the product increase in PPG molecular weight by linking with IPDI. The urethane-linked-PPG-L-PPG was stored under nitrogen at ambient temperature until further use.

DICAP linked polyol was also synthesised under slightly low temperature at 80° C. using following amount of precursor DICAP (MW 1873.44, 20 g), IPDI (1.186 g).

Example 3

Preparation of polyurethane-urea (PUU) using urethane-linked PCL-L-PCL, IPDI and EDA PCL-L-PCL (MW 2148.7, 20.0 g) prepared according to the method described in Example 1 and pre-dried BMPA (0.662 g) was weighed into a round bottomed flask equipped with a mechanical stirrer, addition funnel and a nitrogen inlet together into the flask and the reaction mixture was heated at 90° C. for 1 h with stirring under nitrogen.

IPDI (7.563 g) was then added to the above polyol and BMP mixture under constant stirring and the flask was heated at above temperature for 4 h with stirring under nitrogen.

The flask was cooled down to 60° C. and anhydrous Triethylamine (0.499 g) was added and reacted for 30 mins. The flask was further cooled down to 50° C. and water (70 mL) containing 2 wt % SDDS was added to this pre-cooled pre-polymer mixture and was stirred vigorously to yield an emulsified opaque solution. Chain extension agent EDA (1.187 g) was then added dropwise to this solution at ambient temperature and stirring was continued upon the completion of addition continued until the NCO peak disappeared. The low viscous stable water dispersible polymer emulsion thus obtained was stored in an airtight container at ambient temperature. The polymer showed an average particle size distribution of nm 240±27/. The molecular weight of polymer was $M_n$=102111 $M_w$=584489 and PD=2.86.

The above polymer solution can be crosslinked using 1-20% calcium chloride solution. The crosslinking is preferably carried out by spraying the calcium chloride solution on the soil bed prior to spraying the aqueous PU or PUU solution.

The polymer showed good membrane forming properties post-spray on loam soil at room temperature. The polymer membrane properties were evaluated for moisture retention in different soil types under controlled laboratory conditions.

Example 4

Preparation of polyurethane-urea (PUU) using urethane-linked PCL-L-PCL, IPDI and EDA with low wt % HS PCL-L-PCL (MW 2148.3, 20.0 g) prepared according to the method described in Example 1 and pre-dried BMPA (0.383 g) was weighed into a round bottomed flask equipped with a mechanical stirrer, addition funnel and a nitrogen inlet together into the flask and the reaction mixture was heated at 90° C. for 1 h with stirring under nitrogen.

IPDI (5.247 g) was then added to the above polyol and BMP mixture under constant stirring and the flask was heated at above temperature for 4 h with stirring under nitrogen.

The flask was cooled down to 60° C. and anhydrous Triethylamine (0.288 g) was added and reacted for 30 mins. The flask was further cooled down to 50° C. and water (40 mL) containing 2 wt % SDDS was added to this pre-cooled pre-polymer mixture and was stirred vigorously to yield an emulsified opaque solution. Chain extension agent EDA (0.686 g) was then added dropwise to this solution at ambient temperature and stirring was continued upon the completion of addition continued until the NCO peak disappeared The low viscous stable water dispersible polymer emulsion thus obtained was stored in an air-tight container at ambient temperature. The polymer showed an average particle size distribution of nm 384±146 with 0.5% SCMC. The molecular weight of polymer was $M_n$=115807 $M_w$=322580 and PD=3.22.

Example 5

Preparation of polyurethane-urea (PUU) using urethane-linked PCL-L-PCL, IPDI and EDA with low wt %

The synthesis procedure was identical to Example 4. The amounts of precursors used are as follows;
IPDI=4.615, PCL-L-PCL=20.0 g, BMPA=0.613 g, Triethylamine=0.462 g, Water=60.0 g, EDA=0.412 g The emulsified polymer solution showed good film forming properties film post spray on loam soil at room temperature and showed number molecular weight $M_n$=102111, and PD=2.86.

Figure 3:
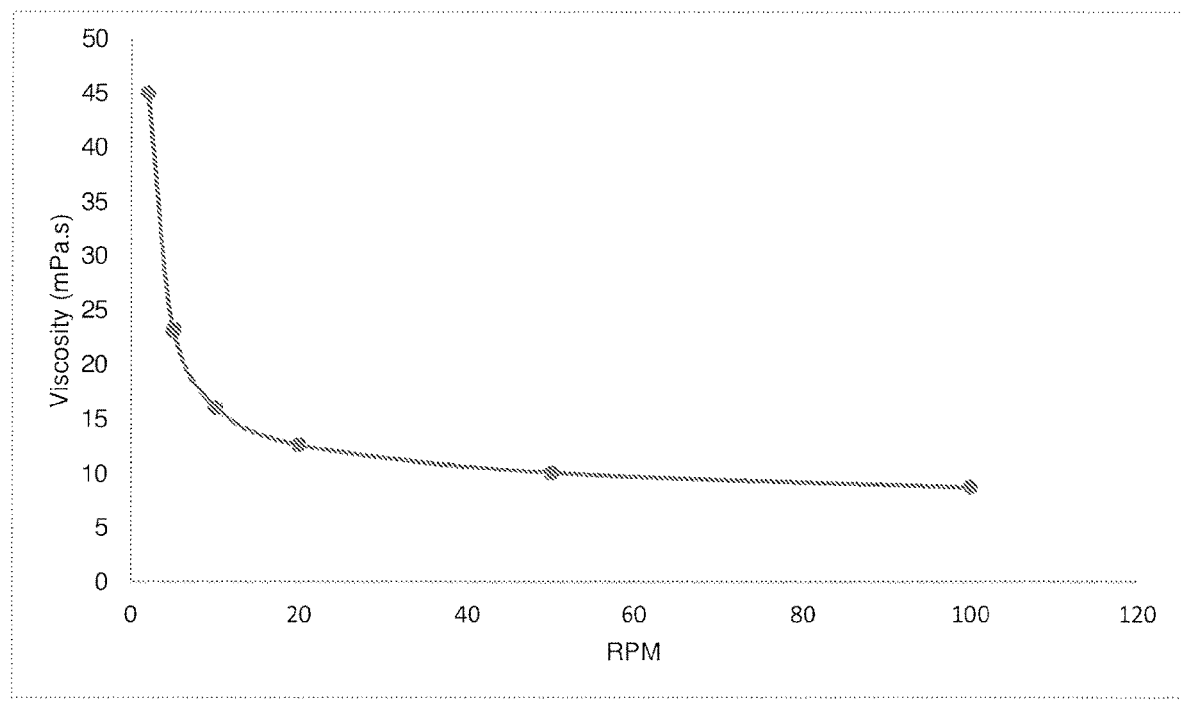
FIG. 3 is a graph showing the variation in viscosity of the formulation with shear (RPM) for the PUU described in Example 4.

The viscosity profile of the PUU of Example 5 was measured and the results are shown in FIG. 3

Example 6

Cationic PUU

PCL-L-PCL (MW 2148.7, 20.0 g) prepared according to the method described in Example 1 and pre-dried MDEA (0.462 g) was weighed into a round bottomed flask equipped with a mechanical stirrer, addition funnel and a nitrogen inlet together into the flask and the reaction mixture was heated at 90° C. for 1 h with stirring under nitrogen.

IPDI (6.385 g) was then added to the above polyol under constant stirring and the flask was heated at above temperature for 4 h with stirring under nitrogen.

The flask was then cooled to 50° C. temperature and glacial acetic acid (0.233 g) was added thorough a syringe and reacted for 30 mins. Deionised water 40.0 mL containing 2 wt % n-Dodecyltrimethylammoniumbromide (DTAB) was added to this prepolymer mixture and was stirred to yield an emulsified opaque solution. EDA (0.931 g) diluted in water added dropwise to this solution. After the addition, the flask temperature was warmed to 25° C. and stirring continued until NCO peak disappeared. The emulsified polymer solution showed good film forming properties film post spray on loam soil at room temperature and showed number molecular weight $M_n$=57235, and PD=1.6

Example 7

Mechanical Properties

|  |  | Example 5 | Example 4 | Example 3 |
|---|---|---|---|---|
| Elongation | Mean | 1156 | 1096 | 653 |
| (%) | Std. Dev. | 130 | 47 | 37 |
| Tensile strength at max load (MPa) | Mean | 16.0 | 12.7 | 19.6 |
|  | Std. Dev. | 3.2 | 3.1 | 2.4 |
| Modulus (Secant 100%) (MPa) | Mean | 6.9 | 5.1 | 6.0 |
|  | Std. Dev. | 0.8 | 1.2 | 0.5 |
| Modulus (Secant 300%) (MPa) | Mean | 4.4 | 2.7 | 3.4 |
|  | Std. Dev. | 0.7 | 0.8 | 0.3 |

Pot Trials

General Procedure for Preparing Polymer Blend

For pot trails, PUU is used in combination with viscosity modifier and other polymers.

For small volumes of PU blends, material, accurately weighed (+/−0.1 g), IS placed in a 100.0 mL Schott bottle and shaken vigorously for 30 seconds. The blends comprise PU, viscosity modifier or biopolymer such as alginate, carbomethoxycellulose, Hydroxyethyl cellulose, Gelatin.

Various PU blends in different ratios with and without biopolymers are prepared using this method.

General Procedure for Preparing Pigmented Polymer Blend

Carbon black pigment, Monarch 460 (~70 m²/g surface area, in the nanoparticle range) was added, as the powder (4% on weight of PU solids), to formulations containing 20% (wt/wt) polyurethane solids, the desired amount of viscosity modifier (CMC) ranging from 0.25 to 0.5% (wt/wt) based on total mass of formulation. Formulations were prepared by stirring the mixture overnight.

General Procedure for Preparing Pigmented Polymer Blend with Humate

Humate was first dissolved thoroughly in water buy continual stirring overnight at room temperature. A Schott bottle and spin bar magnetic stirrer were used for this. A solids content of Humate at 10-15% was then added to formulations where the PU content was 20% by weight with viscosity modifier (SCMC) ranging from 0.25 to 0.5% (wt/wt) based on total mass of formulation.

Method

Small pot trials to determine soil water evaporation are carried out using metal pots with wire mesh bottoms which are packed with soil. (The pots are 105 mm diameter and 50 mm deep-soil is packed into the pot to a height of approximately 45 mm). Three types of soil may be trialled; sand, loam and clay. The surface of the soils is damped down with mist-sprayed water ~5 g per pot using a 'mask' to ensure the spray lands on the soil rather than the container. This is allowed to dry off overnight. The experimental PU is sprayed onto the pot surface using a 'mask' and allowed to membrane form overnight. Treated pots are immersed in ~2 cm of water allowing water to wick up and into the pot through the wire mesh—an untreated pot with the same soil is used to time the immersion. Pots are placed on electronic balances in a conditioned atmosphere room set at 30° C. and 40% Relative Humidity (RH). The time of trial may vary from 4 to 10 days depending on the level of activity.

Example 8

Pot Trials of PU (Example 3, Example 4 and Example 5) on Loam Soil

Figure 4:
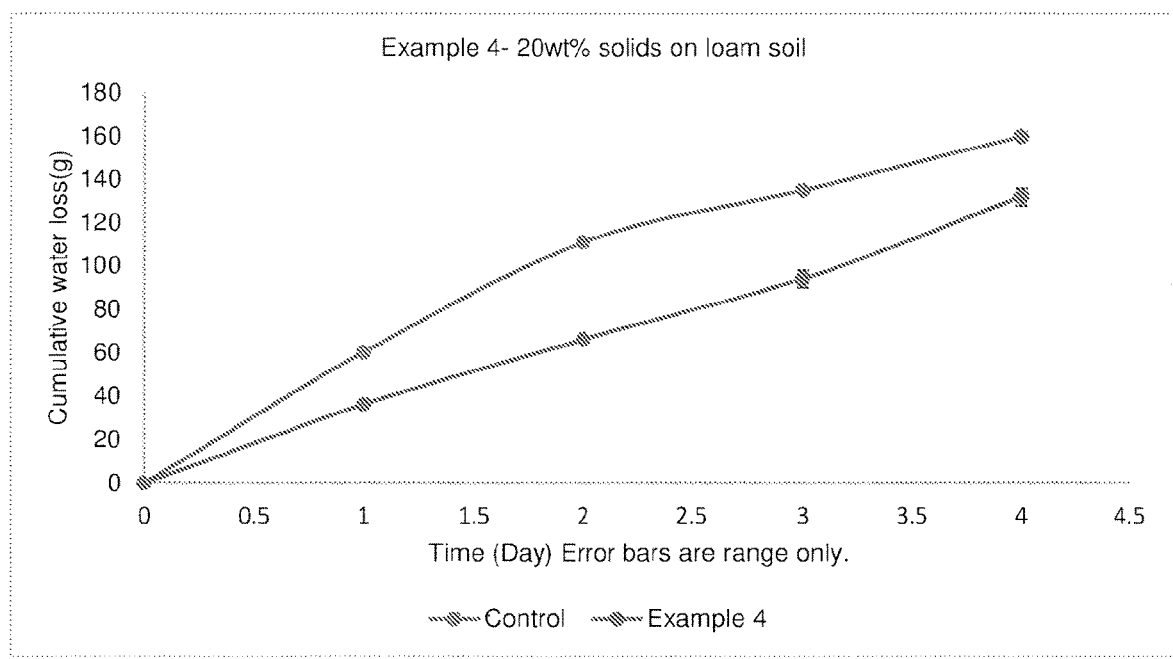
FIG. 4 is a graph comparing the cumulative water loss over time for the loam soil with Example 4 PUU spray application and a control.
Figure 5:
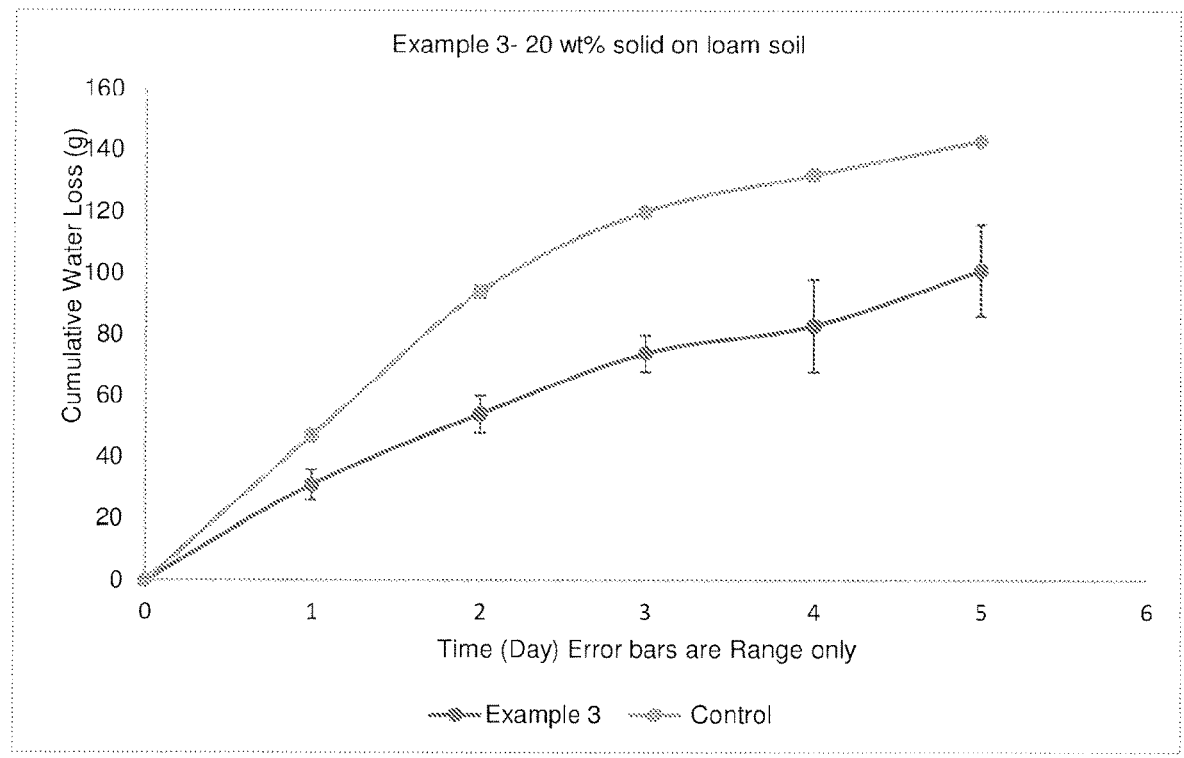
FIG. 5 is a graph comparing the cumulative water loss with time (day) for loam soil on which the composition of Example 3 and a control FIG. 6. Is a graph comparing the cumulative water loss with time (day) for loam soil on which the composition of Example 5 in blend with PUU containing non-linked polyol and a control.

The elastic water-based polyurethane and blends with viscosity modifiers are examined for water barrier properties on small pot trials. The formulation comprised of PUU (Example 3) and (Example 4) with viscosity modifier (CMC) (2.0 wt % solution) in the ratio 1:0.5 provides significantly less water loss compared to control. The results of the trial of Example 3 and 4 are shown in FIGS. 5 and 4.

Changes are made in carrying out laboratory trials with Loam soil to overcome soil cracking and pulling away from the side of pots to get consistent results. The method consists of crushing the dry soils to prepare a relatively flat surface and mist spraying with water. The pots are then allowed to dry overnight. This produces a soil with a closer representation of soils found in fields.

Figure 6:
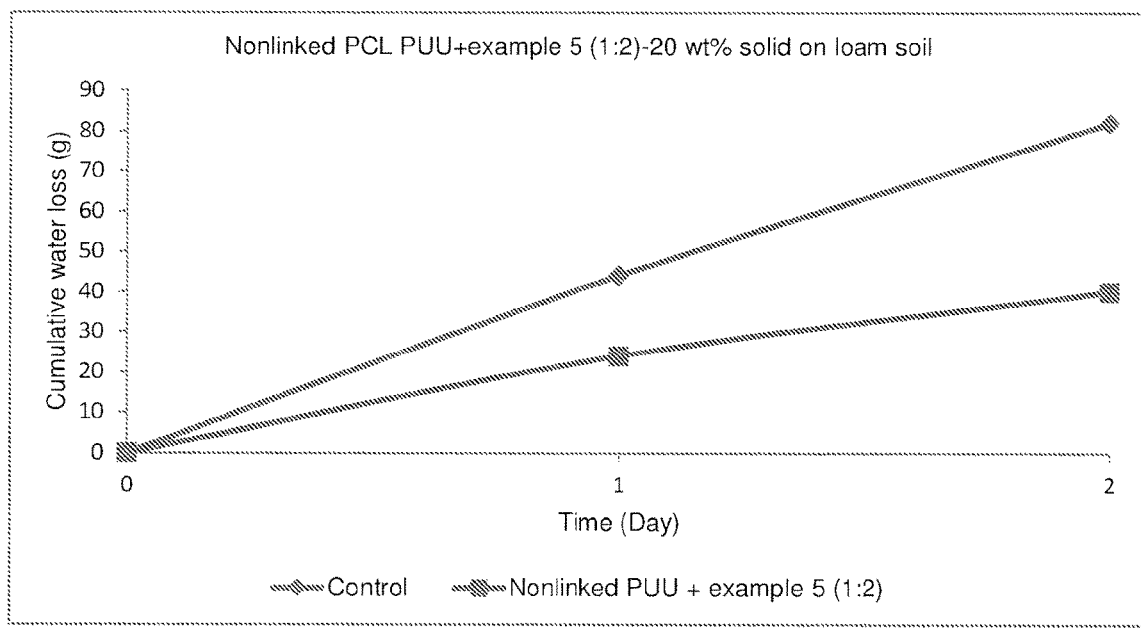

The polyurethane, PCL-L-PCL with low hard segment wt % (Example 5) in a blend with control non linked PCL based formulation (2:1) is sprayed onto small pot trials with the above mentioned soil conditioning and shows reduced soil water evaporation. The results of the trial are presented in FIG. 6.

Example 9

Biodegradation

Figure 7:
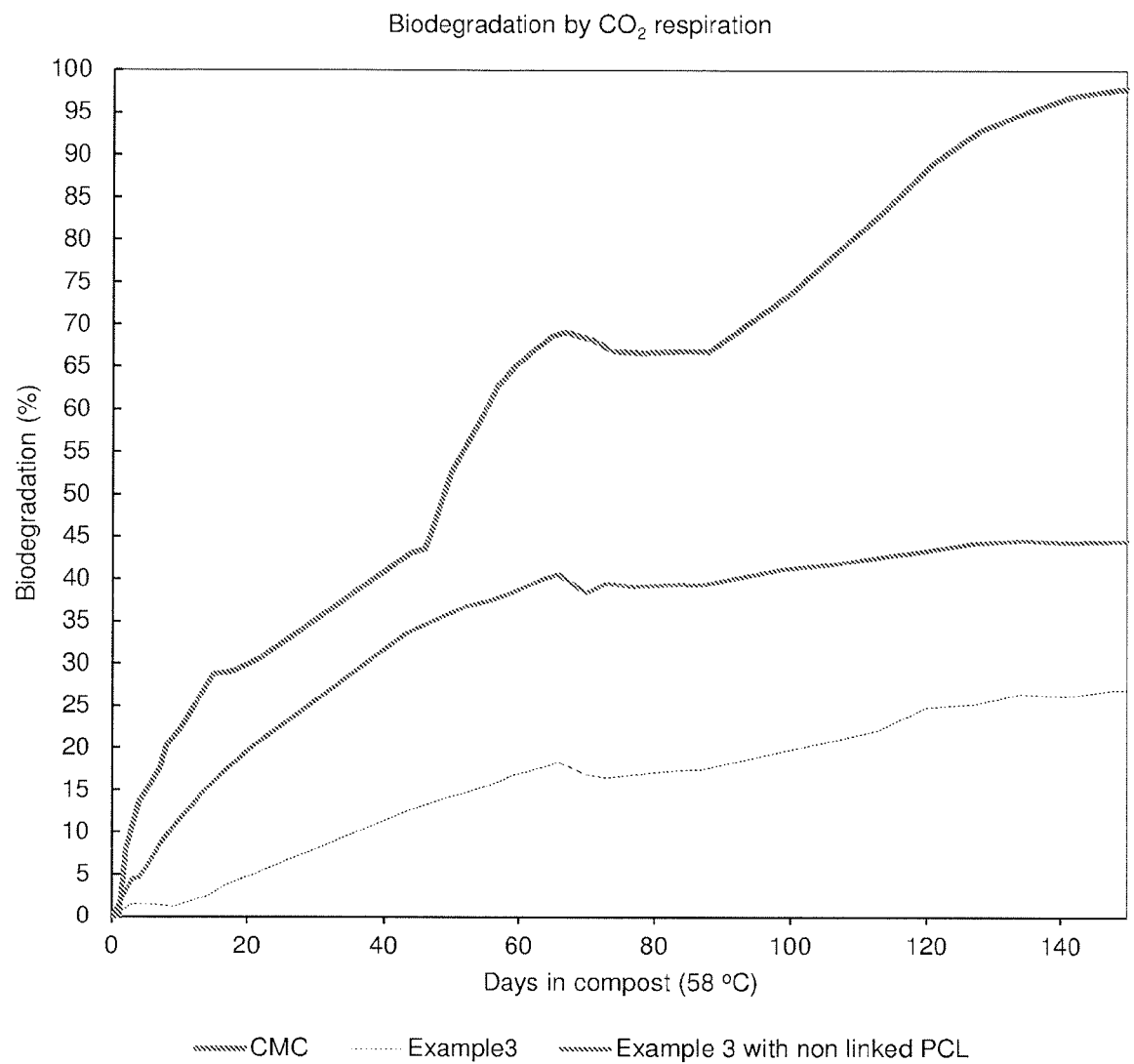
FIG. 7 is a graph comparing the biodegradation (by $CO_2$ respiration) over time of the composition of Example 3 (lowest plot) with a corresponding composition but not prepared using the monomer segment of Formula I (middle plot) and a control of CMC as described in Example 9.

In the aerobic biodegradation test on compost soil under controlled laboratory conditions, PUU formulation with linked PCL polyol (example 3) showed slow polymer degradation compared to PUU formulation with non-linked PCL polyol and control CMC (FIG. 7). GPC of the polymer remains showed $M_n$ 4389 and PD 1.514 compared to initial molecular weight $M_n$ 102111, and PD 2.86.

ADVANTAGES

The polymeric membranes prepared according to the process of the present invention provide a number of distinct advantages over conventional polymeric membranes used for agricultural applications.
- The ability to increase the molecular weight of a "macro-monomer" by linking two or more macrodiols or diamine molecules, allows for the formulation of materials with a wide range of mechanical properties, via the variation in the relative proportions of 'soft' segments (SS; for example a segment derived from the macrodiol or macrodiamine), and hard segments (HS; for example a segment derived from the diisocyanate and an optional chain extender (CE));
- By utilising certain linker molecules, the synthesis of a linked-macrodiol can be prepared prior to the polyurethane/polyurethane-urea synthesis, without involving any purification steps;
- Linked polyol based formulations easy to emulsify with low HS wt % composition;
- Improved properties include especially low modulus and high elasticity suitable for covering soil surfaces;
- Improved controlled particle size and viscosity; and
- Linked polyols can be used alone or in combination with non-linked polyols to maximise the properties of prepared PUUs.

TERMS

With regards to the definitions provided herein, unless stated otherwise, or implicit from context, the defined terms and phrases include the provided meanings. Unless explicitly stated otherwise, or apparent from context, the terms and phrases below do not exclude the meaning that the term or phrase has acquired by a person skilled in the relevant art. The definitions are provided to aid in describing particular embodiments, and are not intended to limit the claimed invention, because the scope of the invention is limited only by the claims. Furthermore, unless otherwise required by context, singular terms shall include pluralities and plural terms shall include the singular.

Herein, the term "polyurethane" relates to a polymer chain that comprises urethane (carbamate, —NH—COO—) links which connect monomer or "macro-monomer" units. Polyurethanes can be produced via the reaction of molecules containing a minimum of two isocyanate functional groups with other molecules which contain at least two alcohol (hydroxyl) groups.

Herein, the term "polyurethane-urea" relates to a polymer chain that comprises both urethane and urea linking groups.

Herein, the term "polyol" denotes a compound, which has "active hydrogen containing" groups that can be reacted and includes materials having an average of about two or more hydroxyl groups per molecule.

Polyols include but are not limited to diols, triols, and tetraols and macrodiols.

Herein, the term "active hydrogen containing" refers to compounds having hydrogen atoms which can react with isocyanate groups. For example, such hydrogen atoms include hydrogen atoms attached to oxygen, nitrogen or sulphur and include compounds which have at least two groups selected from the group consisting of —OH, —SH and —NH—.

Herein, the term "macrodiol" refers to a polymeric material comprising two hydroxyl groups. For example, a copolymer segment of Formula 1 with two hydroxyl groups.

Herein, the term "membrane" is used to refer to a thin pliable sheet or film of material forming a barrier or lining. In the present context, the membrane generally acts to provide a mulch and thereby suppress weed growth and restrict water loss from the soil. The membrane generally improves plant growth; in many cases allowing early harvesting of crops. The membrane avoids soil deterioration resulting from use of plastics such a polyethylene and indeed generally acts to improve the fertility and health of the soil.

Herein, the term "mulch" is used to refer to a layer of membrane applied to the surface of an area of soil used in crop production.

Herein, the term "plants" refers to all physical parts of plants including seeds, seedlings, saplings, roots, tubes and material from which plants may be propagated.

Herein, the term "agriculture", refers to the cultivation of animals, plants, fungi, and other life forms. In particular in the context of the present invention agriculture refers to cultivation of crops for food, fiber, biofuel, medicinal and other products used to sustain and enhance human life.

Herein, the term "soil materials" refers to soil and its solid components, including minerals and/or organic matter and a porous component that hold gases, water, solutes and organisms. Soil materials can vary from being soft and friable in some situations to a hard and structureless mass with concrete like properties in others. While soils are the foundation for natural and agricultural ecosystems, they also serve as the foundation for most construction and are used in a range of engineering and other applications, including concrete, road foundations, liners in irrigation canals and aquaculture ponds, and as capping materials for mine waste dumps and municipal waste dumps. In its broadest context, soil materials used in agriculture include construction materials such as concrete which may be used in agriculture applications such as structures for retaining soil, irrigation channels or conduits and the like.

Herein, the term "soil" refers to the life-supporting upper surface of earth that is the basis of all agriculture. It contains minerals and gravel from the chemical and physical weathering of rocks, decaying organic matter (humus), microorganism, insects, nutrients, water, and air. Soils differ according to the climate, geological structure, and rainfall of the area and are constantly being formed, changed and removed by natural, animal, and human activity.

Herein, the term "pendent" refers to a chemical group covalently attached to the backbone chain of a polymer. The term "intra-chain" refers to a group within the main chain which forms the backbone of the polyurethane or polyurethane-urea elastomer.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A process for preparing a polymeric membrane on materials used in crop production comprising:
   a) providing a copolymer segment of Formula I $$A^1\text{-}[Y^1]_n\text{-}L\text{-}[Y^2]_q\text{-}A^2 \quad \text{Formula I}$$

wherein
   $A^1$ is an end capping group selected from hydroxyl and amine;
   $A^2$ is hydrogen or an end capping group selected from hydroxyl and amine;
   each $[Y^1]_n$ and $[Y^2]_q$ is independently selected from a polyether macrodiol, polycarbonate macrodiol, polyester macrodiol,
   and wherein at least one of $[Y^1]_n$ and $[Y^2]_q$ is a polyester macrodiol;
   L is a divalent linking compound independently selected from urethane and urea;
   n is an integer of 2 to 50; and
   q is an integer of 2 to 50;
   b) combining the copolymer segment of Formula I with:
      a diisocyanate or polyisocyanate;
      one or more chain extenders; and
      optionally an additional polyol or polyamine;
      to react the copolymer of Formula I therewith and form a polyurethane or polyurethane-urea elastomer; and
   c) spraying an aqueous dispersion of the polyurethane or polyurethane-urea elastomer onto materials to be used in crop production to form the polymeric membrane on the materials.

2. A process according to claim 1, wherein $[Y^1]_n$ and $[Y^2]_g$ are each polyester macrodiols.

3. A process according to claim 2, wherein the polyester macrodiol comprises an aliphatic polyester.

4. A process according to claim 2, wherein the polyester macrodiol comprises at least one polyester selected from the group consisting of polylactic acid, poly(glycolic acid), polycaprolactone, polyvalerolactone, poly(hydroxyl valerate), polyethylene succinate), poly(butylene succinate), poly (butylene succinate adipate), poly(ethylene adipate) poly (para-dioxanone) and polydecalactone.

5. A process according to claim 1, wherein L is a urethane residue of a diisocyanate.

6. A process according to claim 1, wherein the polyurethane or polyurethane-urea elastomer is synthesised without catalyst.

7. A process according to claim 1, wherein the polyurethane or polyurethane-urea elastomer is synthesised without use of any organic solvents.

8. A process according to claim 1, wherein the material used in crop production is selected from the group consisting of soil materials, granular materials comprising active agents selected from the group consisting of pesticides, plant growth regulators and fertilizers.

9. A process according to claim 1, wherein the material used in crop production is an area of soil for growing crops.

10. A process according to claim 1, wherein the polyether macrodiol is selected from polypropylene glycol, polyethylene oxide and poly(tetramethylene oxide) (PTMO).

11. A process according to claim 1, wherein $A^1$ and $A^2$ are each independently selected from hydroxyl and amine.

12. A process according to claim 1, wherein the weight average molecular weight range of the copolymer segment of Formula I is between about 1000 and 10,000.

13. A process according to claim 1, wherein the divalent linking compound is selected from the group consisting of: hexamethylene 1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, alkyl-lysine diisocyanate, dicyclohexlymethane diisocyanate, isophorone diisocyanate, 1,4-cyclohexane diisocyanate, 1,4-cyclohexane his(methylene isocyanate), 1,3-bis(isocyanatomethyl) cyclohexane, and mixtures thereof.

14. A process according to claim 1, wherein at least one chain extender is selected from: 1,4-butanediol, 1,6-hexanediol, 1,8-octanediol, 1,9-nonanediol, 1,10-decanediol 1,4-cyclohexane dimethanol, p-xylene glycol, 1,4-his (2-hydroxyethoxy) benzene, 1,12-dodecanediol, ethylene diamine, ethanolamine, butane diamine or propane diamine.

15. A process according to claim 1, wherein the polyurethane or polyurethane elastomer is derived from reaction of the copolymer segment of Formula I with a diisocyanate and at least one active hydrogen containing compound comprising an ionic or ionisahle group which provides ionic groups on neutralisation.

16. The process according to claim 15, wherein the ionic species is derived from a monomer selected from the group consisting of

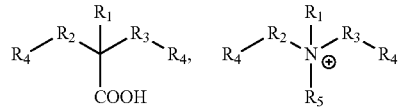

and mixtures thereof, where: $R_1$ is an alkyl group of 1 to 4 carbons;
$R_2$ and $R_3$ are independently selected from the group consisting of alkyl diradical groups of 1 to 4 carbon atoms; aryl diradical groups; aralkyl diradical groups; polyester diradical segments and polyether diradical segments;
$R_4$ is hydroxyl (OH) or primary amine ($NH_2$); and
$R_5$ is independently selected from the group consisting of alkyl groups of 1 to 18 carbon atoms; aryl groups and aralkyl groups.

17. A process according to claim 1, wherein the polyurethane or polyurethane-urea elastomer is present in the aqueous dispersion in an amount of from about 5% to about 60% by weight of the aqueous dispersion.

18. A process according to claim 1, wherein the aqueous dispersion of the polyurethane or polyurethane-urea elastomer is mixed with carbon black pigmentation to control weed growth, and/or with nutrients to provide additional nutrients to soil.

19. A process according to claim 1 further comprising planting a crop before, during or after applying the aqueous dispersion to soil.

20. A process according to claim 1, wherein the copolymer segment of Formula I is prepared by a process comprising combining at least one macrodiol with a linking compound which is a diiisocyanate or product of an amine and a diisocyanate to react yje at least one macrodiol and linking compound and form the copolymer segment of Formula I in which the linking compound is consumed.

* * * * *